(12) United States Patent (10) Patent No.: US 12,347,181 B2
Huang et al. (45) Date of Patent: *Jul. 1, 2025

(54) NEURAL SIGNAL DETECTION CIRCUIT OUTPUTTING TIME DIFFERENCE DATA OR NEURAL DATA

(71) Applicant: PixArt Imaging Inc., Hsin-Chu County (TW)

(72) Inventors: Sen-Huang Huang, Hsin-Chu County (TW); Ren-Chieh Liu, Hsin-Chu County (TW); Yi-Hsien Ko, Hsin-Chu County (TW); Han-Chi Liu, Hsin-Chu County (TW); Yi-Cheng Chiu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 635 days.

This patent is subject to a terminal disclaimer.

(21) Appl. No.: 17/517,036

(22) Filed: Nov. 2, 2021

(65) Prior Publication Data

US 2022/0058410 A1 Feb. 24, 2022

Related U.S. Application Data

(63) Continuation-in-part of application No. 17/395,527, filed on Aug. 6, 2021, now Pat. No. 11,812,176, and a continuation-in-part of application No. 17/333,022, filed on May 28, 2021, now Pat. No. 11,783,633, said application No. 17/395,527 is a continuation-in-part of application No. 17/009,417, filed on Sep. 1, 2020, now Pat. No. 11,290,671, said application No. 17/333,022 is a continuation of application No.
(Continued)

(51) Int. Cl.
*G06V 10/94* (2022.01)
*G06V 10/22* (2022.01)
*G06V 40/20* (2022.01)

(52) U.S. Cl.
CPC .............. *G06V 10/94* (2022.01); *G06V 10/22* (2022.01); *G06V 40/20* (2022.01)

(58) Field of Classification Search
CPC ........ G06V 10/94; G06V 10/22; G06V 40/20; G06V 40/15; H04N 25/75; H04N 25/77; H04N 25/772
See application file for complete search history.

(56) References Cited

U.S. PATENT DOCUMENTS 6,366,317 B1 4/2002 Mattison et al.
9,936,153 B1 4/2018 Mao et al.
(Continued)

FOREIGN PATENT DOCUMENTS

CN 102196191 A 9/2011

*Primary Examiner* — Albert H Cutler
(74) *Attorney, Agent, or Firm* — WPAT, PC

(57) ABSTRACT

There is provided a neural signal detection circuit capable of outputting time difference data or neural data, and including a first temporal circuit and a second temporal circuit. The first temporal circuit is used to store detected voltage energy of a first interval and a second interval as the time difference data. The second temporal circuit is used to store detected voltage energy of the second interval as the neural data. The neural signal detection circuit is used to output the time difference data or the neural data in different operating modes.

9 Claims, 20 Drawing Sheets

Related U.S. Application Data

16/893,936, filed on Jun. 5, 2020, now Pat. No. 11,055,548.

(60) Provisional application No. 63/155,454, filed on Mar. 2, 2021.

(56) References Cited

U.S. PATENT DOCUMENTS

| | | |
|---|---|---|
| 11,546,540 B2 | 1/2023 | Liu et al. |
| 11,706,542 B2 | 7/2023 | Liu et al. |
| 11,792,550 B2 | 10/2023 | Liu et al. |
| 11,812,176 B2 * | 11/2023 | Liu ................. H04N 25/00 |
| 2006/0013485 A1 | 1/2006 | Nitta et al. |
| 2010/0259660 A1 * | 10/2010 | Kukita ............... H04N 25/70 |
| | | 348/308 |
| 2011/0025898 A1 | 2/2011 | Ni |
| 2011/0054583 A1 * | 3/2011 | Litt .................. A61B 5/291 |
| | | 600/377 |
| 2011/0304757 A1 * | 12/2011 | Egawa ............... H04N 25/767 |
| | | 348/300 |
| 2016/0344969 A1 | 11/2016 | Furukawa et al. |
| 2017/0163913 A1 | 6/2017 | Shigeta et al. |
| 2017/0318248 A1 * | 11/2017 | Maehashi ............. H04N 25/75 |
| 2017/0353675 A1 | 12/2017 | Onuki et al. |
| 2018/0063459 A1 | 3/2018 | Stark |
| 2018/0227516 A1 | 8/2018 | Mo et al. |
| 2018/0241960 A1 | 8/2018 | Sakakibara et al. |
| 2020/0244902 A1 | 7/2020 | Yoshikawa |
| 2022/0159201 A1 | 5/2022 | Kitano |

\* cited by examiner

NEURAL SIGNAL DETECTION CIRCUIT OUTPUTTING TIME DIFFERENCE DATA OR NEURAL DATA

CROSS REFERENCE TO RELATED APPLICATION

The present application claims the priority benefit of U.S. Provisional Application Ser. No. 63/155,454, filed on Mar. 2, 2021, and is a continuation-in-part application of U.S. patent application Ser. No. 17/395,527 filed on, Aug. 6, 2021, which is a continuation-in-part application of U.S. patent application Ser. No. 17/009,417 filed on, Sep. 1, 2020, the disclosures of which are hereby incorporated by reference herein in their entirety. The present application is also a continuation-in-part application of U.S. patent application Ser. No. 17/333,022 filed on, May 28, 2021, which is a continuation application of U.S. patent application Ser. No. 16/893,936 filed on, Jun. 5, 2020, the disclosures of which are hereby incorporated by reference herein in their entirety.

BACKGROUND

1. Field of the Disclosure

This disclosure generally relates to a detection circuit and, more particularly, to a neural signal detection circuit capable of selecting to output a pulse width signal corresponding to time difference data and neural data.

2. Description of the Related Art

Electroencephalogram (EEG) signals are gradually applied to the field of medical diagnosis and neurobiology with the development of neural science, cognitive psychology and artificial intelligent research.

Generally, electrodes are used to acquire voltage signals as the EEG signals.

The electrodes can be used to acquire voltage signals include dry electrodes and wet electrodes. Compared with the wet electrodes, as conducting medium is not required in using dry electrodes, the complexity in preparing the detection is significantly reduced and the preparation time is shortened.

As the EEG signals are in the scale of millivolt, how to accurately and quickly acquire clean EEG signals is an issue. In addition, analyzing and processing the acquired voltage signals is another issue.

SUMMARY

The present disclosure provides a neural signal detection circuit capable of outputting time difference data and neural data.

The present disclosure provides a neural signal detection structure including an electrode, a first temporal circuit, a second temporal circuit, a first comparator and a second comparator. The electrode is configured to generate a detected voltage. The first temporal circuit includes a first capacitor having a first end coupled to the electrode. The second temporal circuit includes a second capacitor having a first end coupled to the electrode. The first comparator includes a first input transistor and a second input transistor. The first input transistor is arranged inside the first temporal circuit and connected to a second end of the first capacitor. The second input transistor is arranged outside the first temporal circuit and shared with other neural signal detection circuits. The second comparator includes a third input transistor and a fourth input transistor. The third input transistor is arranged inside the second temporal circuit and connected to a second end of the second capacitor. The fourth input transistor is arranged outside the second temporal circuit and shared with the other neural signal detection circuits.

The present disclosure further provides a neural signal detection circuit including an electrode, a first temporal circuit and a second temporal circuit. The electrode is configured to generate a detected voltage. The first temporal circuit includes a first capacitor having a first end coupled to the electrode. The second temporal circuit includes a second capacitor having a first end coupled to the electrode. A second end of the first capacitor is coupled to an inverting input terminal of a first comparator, which is arranged outside the neural signal detection circuit and shared by the first temporal circuit and other neural signal detection circuits. A second end of the second capacitor is coupled to an inverting input terminal of a second comparator, which is arranged outside the neural signal detection circuit and shared by the second temporal circuit and the other neural signal detection circuits.

The present disclosure further provides a neural signal detection circuit including a source follower, a first temporal circuit and a second temporal circuit. The first temporal circuit includes a first capacitor having a first end coupled to the source follower. The second temporal circuit includes a second capacitor having a first end coupled to the source follower. A second end of the first capacitor is coupled to an inverting input terminal of a first comparator, which is arranged outside the neural signal detection circuit and shared by the first temporal circuit and other neural signal detection circuits. A second end of the second capacitor is coupled to an inverting input terminal of a second comparator, which is arranged outside the neural signal detection circuit and shared by the second temporal circuit and the other neural signal detection circuits.

In the present disclosure, the electrode is selected from a dry electrode and a wet electrode. In one aspect, detected voltages generated by the electrode are amplified and filtered at first and then transferred to the temporal circuit.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The present disclosure is related to a neural signal detection circuit that performs analog operation on neural signals. Every detection circuit outputs a detection signal having a pulse width corresponding to a detected voltage. An operation circuit is used to perform the analog operation on the pulse width (PW) signals. The voltage value after the analog operation is further converted to a PW signal using a voltage-temporal conversion circuit at first and then a next analog operation is performed by the same or by another operation circuit. In this way, all data operation is accomplished in the analog phase without being converted to digital data at first.

Figure 1:
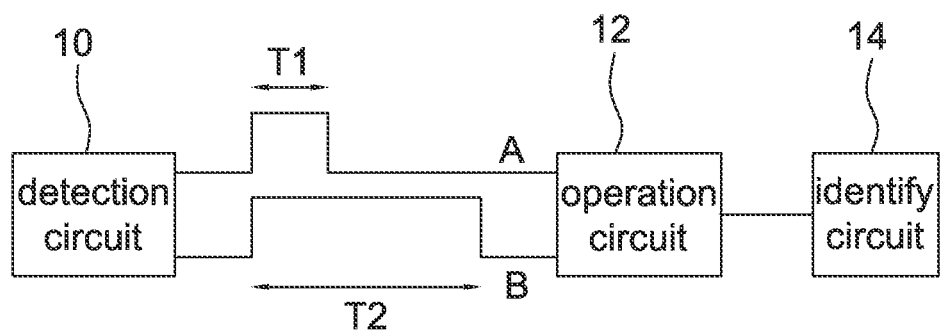
FIG. 1 is a schematic block diagram of a circuit structure of a neural signal detection circuit according to one embodiment of the present disclosure.

Referring to FIG. 1, it is a schematic block diagram of a circuit structure of a neural signal detection circuit (sometimes abbreviated as detection circuit) according to one embodiment of the present disclosure. The circuit structure includes a neural signal detection circuit 10 and an operation circuit 12. The neural signal detection circuit 10 is used to output detection signals of different time intervals, e.g., signals A and B in FIG. 1 indicating different detection signals detected within different time intervals. In the present disclosure, the detection signals A and B respectively indicate magnitude of voltage energy detected by the neural signal detection circuit 10 using pulse widths T1 and T2, wherein when the detected voltage energy is larger, the pulse width of the corresponding detection signals A or B is longer.

Figure 5:
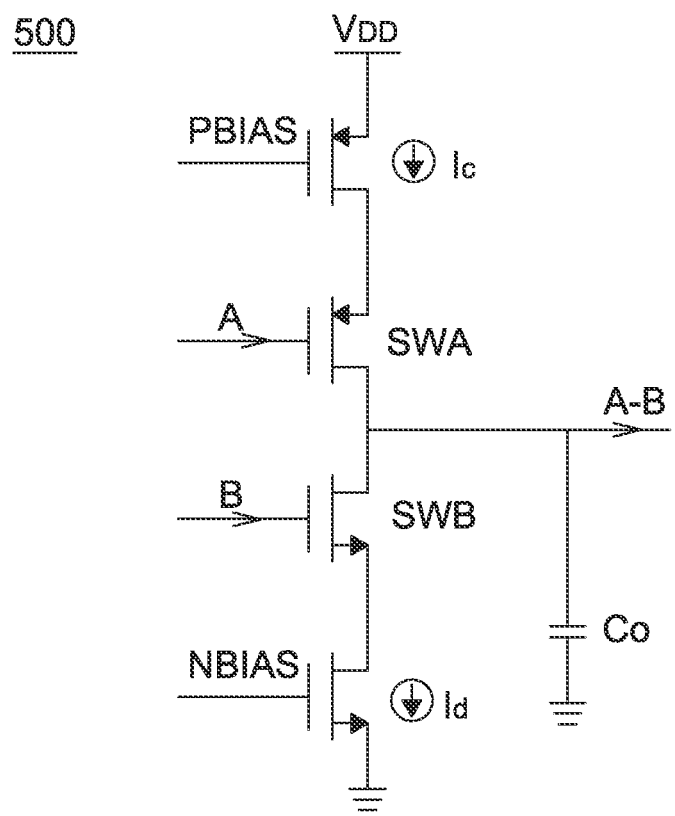
FIG. 5 is a circuit diagram of a subtraction circuit of a neural signal detection circuit according to one embodiment of the present disclosure.
Figure 6:
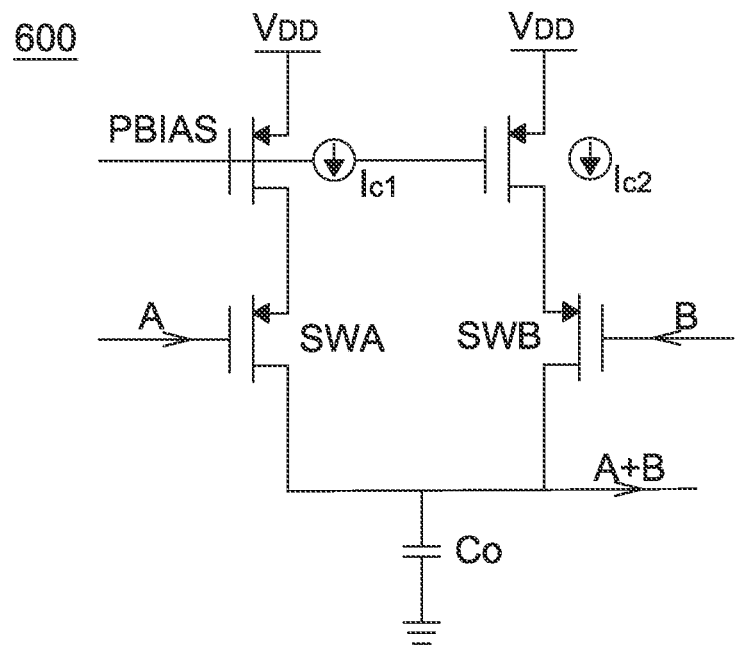
FIG. 6 is a circuit diagram of an addition circuit of a neural signal detection circuit according to one embodiment of the present disclosure.
Figure 7:
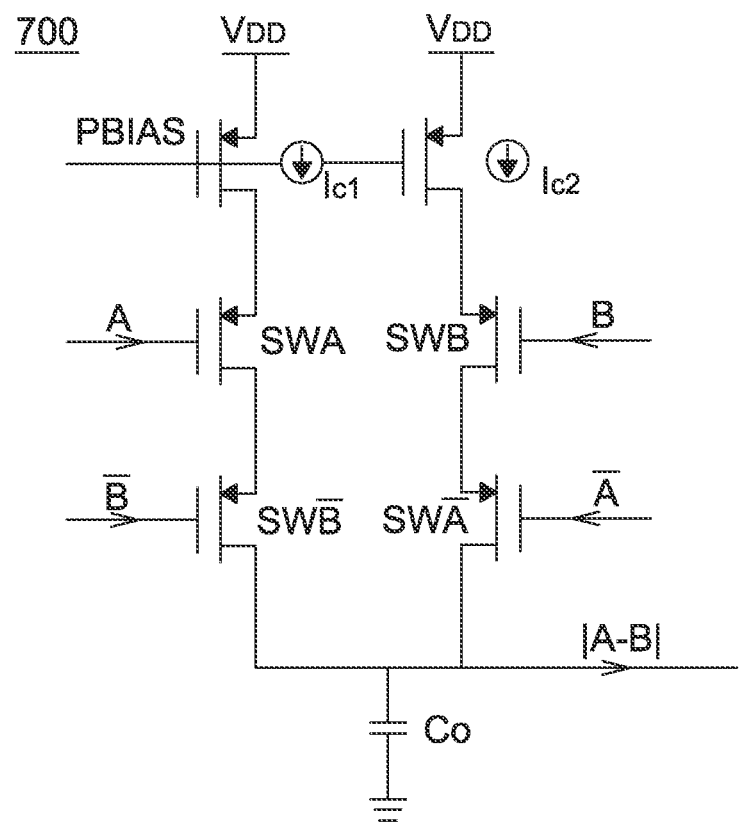
FIG. 7 is a circuit diagram of an absolute difference circuit of a neural signal detection circuit according to one embodiment of the present disclosure.

The operation circuit 12 includes any circuit used to perform the operation between signals, e.g., described by a subtraction circuit in FIG. 5, an addition circuit in FIG. 6 and an absolute difference circuit in FIG. 7 herein, but not limited thereto. In a detection array including multiple detection circuits, the operation circuit 12 is arranged inside each detection circuit to process data in the detection circuit or arranged between detection circuits to process data between detection circuits.

In some aspects, the circuit structure further includes an identify circuit 14. The identify circuit 14 includes, for example, a comparator for comparing the output result of the operation circuit 21 with a predetermined threshold so as to identify an operating state of a device adopting the circuit structure of the present disclosure. For example, the identify circuit 14 is used to identify whether the electrode is lifted up. The output result of the operation circuit 12 indicates a voltage energy variation. When the identify circuit 14 identifies that the voltage energy variation is larger than or smaller than a threshold, the electrode is identified to be lifted up. The identify circuit 14 then outputs a control signal to perform corresponding controls, e.g., outputting voltage signals, but not limited to.

Figure 2:
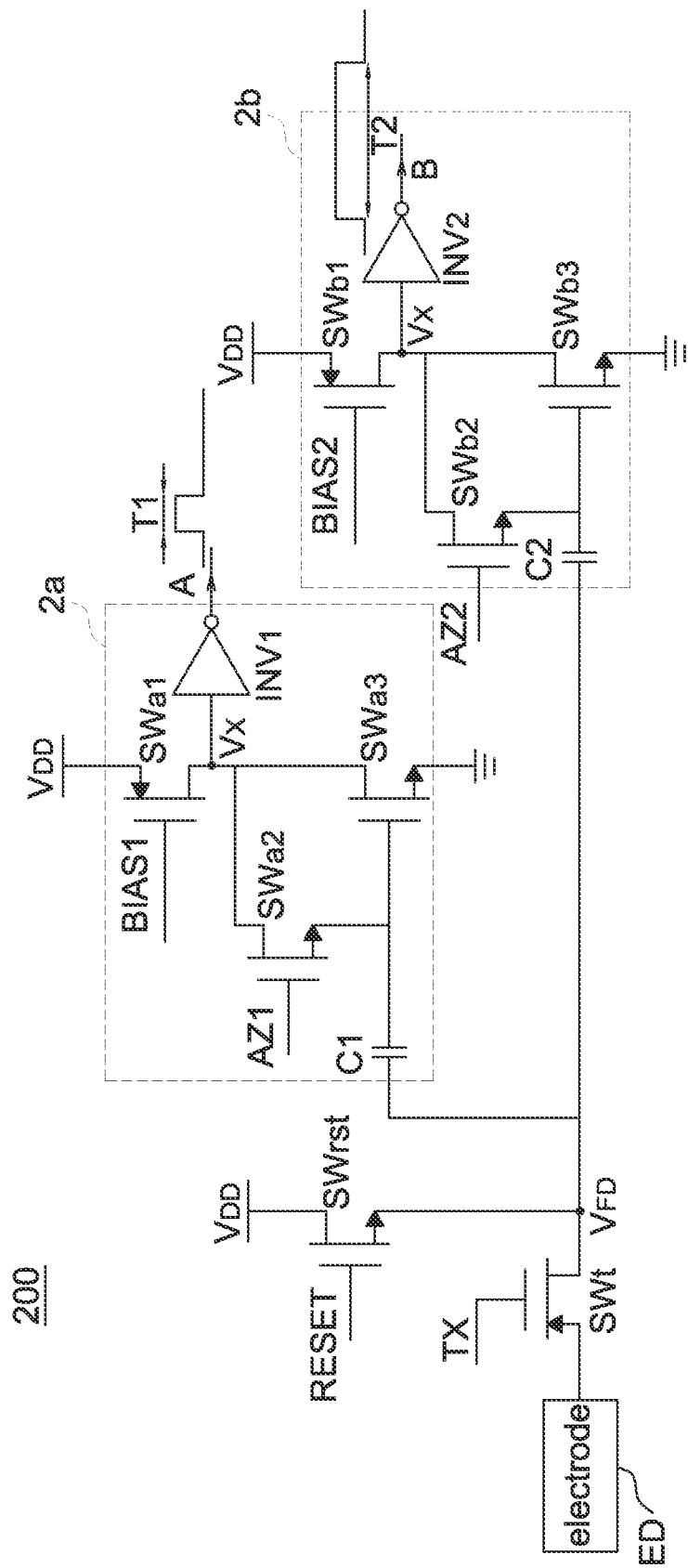
FIG. 2 is a circuit diagram of a neural signal detection circuit according to one embodiment of the present disclosure.

Please referring to FIG. 2, it is a circuit diagram of a neural signal detection circuit 200 according to one embodiment of the present disclosure. The neural signal detection circuit 200 is used to output pulse width (PW) signals A and B, i.e. detection signals. The neural signal detection circuit 200 includes an electrode ED, a transfer transistor SWt, a reset transistor SWrst, a first temporal circuit 2a and a second temporal circuit 2b all connected to a node $V_{FD}$.

The electrode ED is used to generate a detected voltage. The detected voltage is respectively stored in the first temporal circuit 2a and the second temporal circuit 2b within different time intervals (e.g., controlled by a control signal TX). In the present disclosure, in addition to storing voltage energy detected within different time intervals, the first temporal circuit 2a and the second temporal circuit 2b further respectively convert the stored voltage energy into detection signals A and B having corresponding pulse widths (e.g., T1 and T2) for the operation circuit 12 to perform analog operation. The first temporal circuit 2a and the second temporal circuit 2b have identical circuit arrangement only being operated within different time intervals.

Figure 4A:
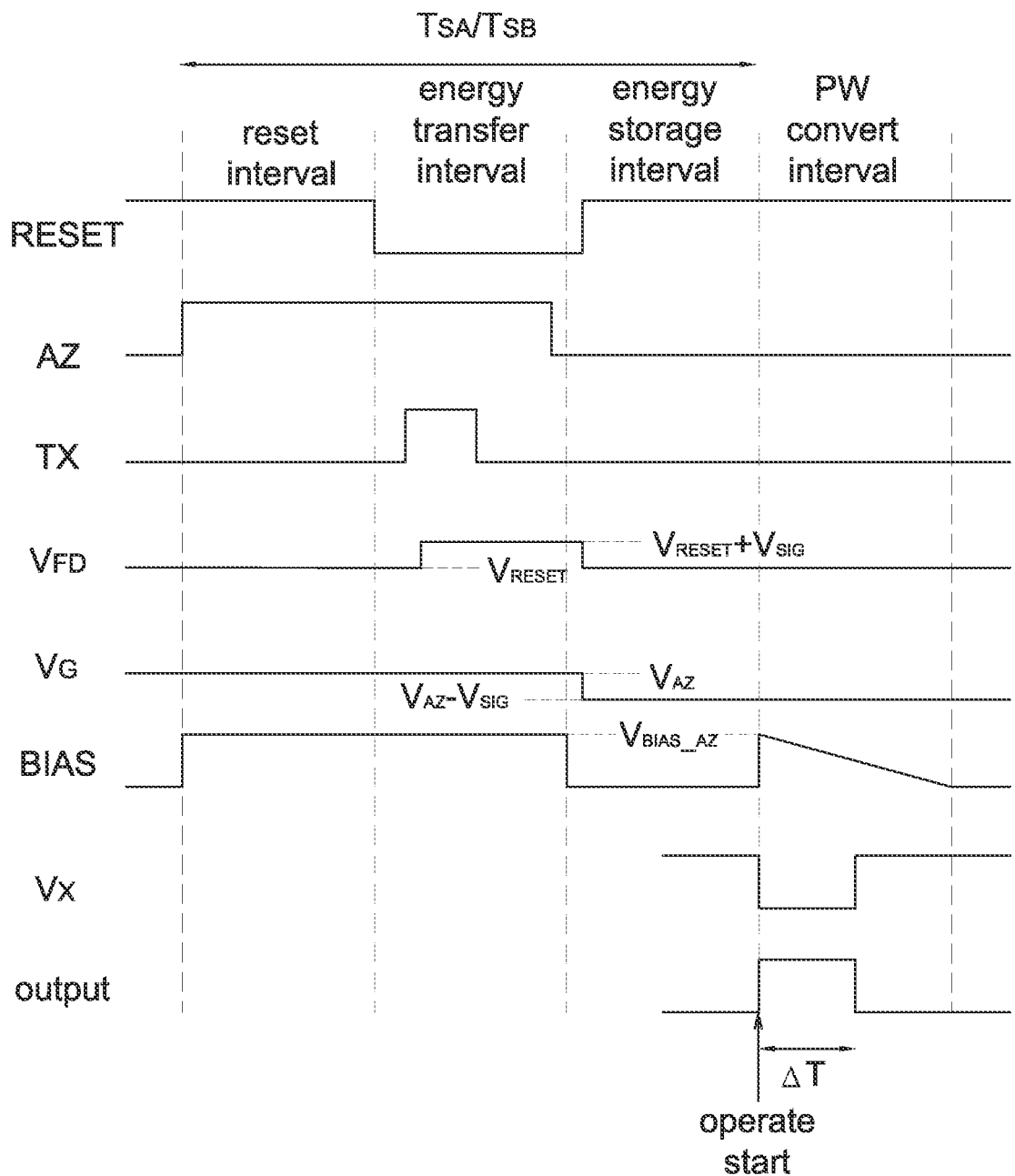
FIG. 4A is an operational timing diagram of the temporal circuit in FIG. 3.
Figure 4B:
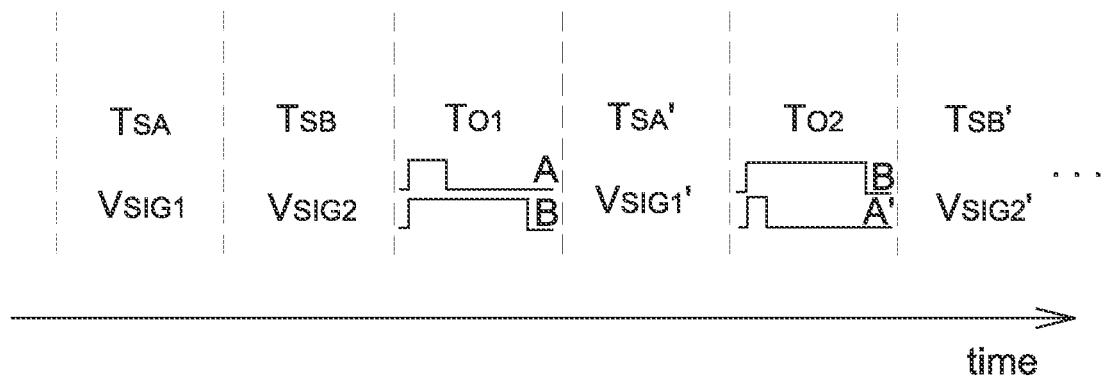
FIG. 4B is an operational timing diagram of the neural signal detection circuit in FIG. 2.

The first temporal circuit 2a stores first detected voltage (e.g., referring to $V_{SIG1}$ shown in FIG. 4B), generated by the electrode ED within a first interval (e.g., referring to $T_{SA}$ shown in FIG. 4B), and outputs a first detection signal A having a first pulse width T1 according to the first detected voltage $V_{SIG1}$ within an operation interval (e.g., referring to $T_{O1}$ shown in FIG. 4B).

The second temporal circuit 2b stores second detected voltage (e.g., referring to $V_{SIG2}$ shown in FIG. 4B) generated by the electrode ED within a second interval (e.g., referring to $T_{SB}$ shown in FIG. 4B), and outputs a second detection signal B having a second pulse width T2 according to the second detected voltage $V_{SIG2}$ within the operation interval $T_{O1}$. It is appreciated that lengths of T1 and T2 in drawings are only intended to illustrate but not to limit the present disclosure.

The reset transistor SWrst is coupled between a voltage source $V_{DD}$ and the node $V_{FD}$, and used to reset the first temporal circuit 2a in the first interval $T_{SA}$ and reset the second temporal circuit 2b in the second interval $T_{SB}$.

The transfer transistor SWt is coupled between the electrode ED and the node $V_{FD}$, and used to transfer the first detected voltage $V_{SIG1}$ to be stored into the first temporal circuit 2a in the first interval $T_{SA}$ and transfer the second detected voltage $V_{SIG2}$ to be stored into the second temporal circuit 2b in the second interval $T_{SB}$. In this way, the neural signal detection circuit 200 stores detected voltage energy of different time intervals to indicate the variation of detected neural signal with time.

In some aspects, the first temporal circuit 2a further includes a first inverter INV1 coupled between an output terminal of the first temporal circuit 2a and the operation circuit 12, and the first inverter INV1 is used to invert a phase of the first detection signal A; the second temporal circuit 2b further includes a second inverter INV2 coupled between an output terminal of the second temporal circuit 2b and the operation circuit 12, and the second inverter INV2 is used to invert a phase of the second detection signal B. In other aspects, the first inverter INV1 and the second inverter INV2 are arranged in the operation circuit 12 instead of being arranged in the first temporal circuit 2a and the second temporal circuit 2b.

Figure 3:
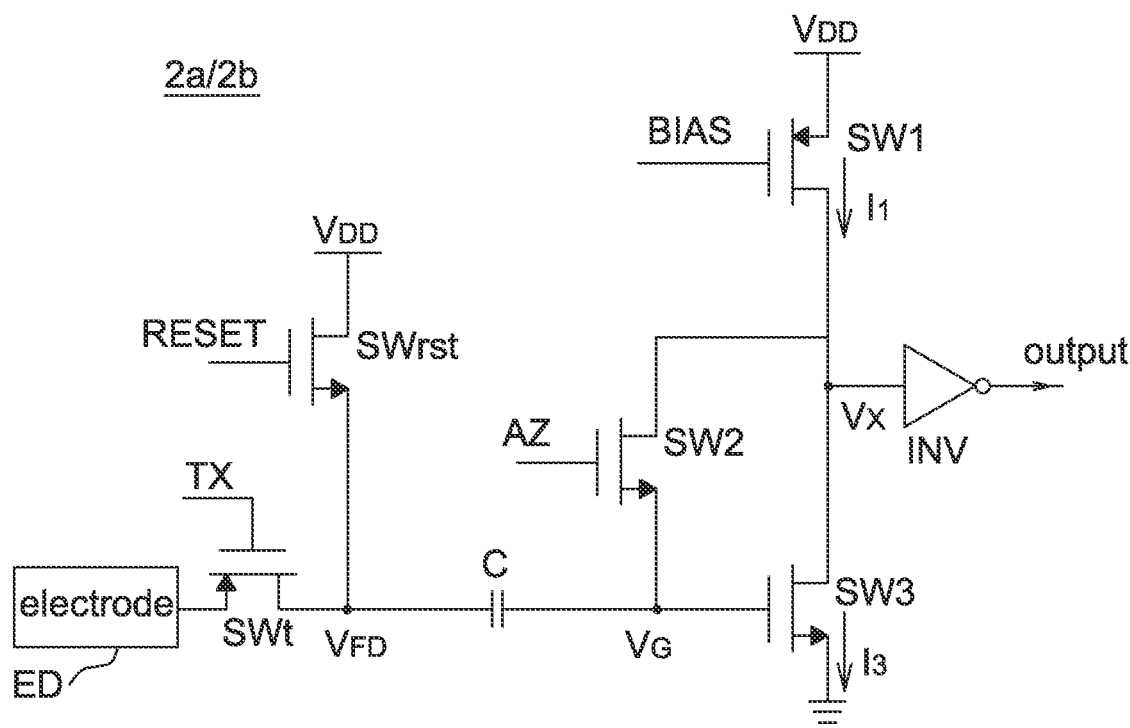
FIG. 3 is a circuit diagram of a temporal circuit of a neural signal detection circuit according to one embodiment of the present disclosure.

Please referring to FIGS. 3 and 4A, FIG. 3 is a circuit diagram of the temporal circuit (e.g., 2a and 2b) of a neural signal detection circuit according to one embodiment of the present disclosure; and FIG. 4A is an operational timing diagram of the temporal circuit 2a/2b in FIG. 3. It should be mentioned that although FIG. 2 shows that a single detection circuit includes two temporal circuits, but the present disclosure is not limited thereto. In other aspects, each detection circuit includes a single temporal circuit as shown in FIG. 3 to output a PW signal A or B.

In the present disclosure, operation of the temporal circuits 2a and 2b in FIG. 2 is described using FIGS. 3 and 4A.

The temporal circuits 2a and 2b respectively include a storage capacitor C, a first transistor SW1, a second transistor SW2 and a third transistor SW3. The storage capacitors and the first to third transistors are indicated by different reference numerals in FIG. 2 to indicate belonging to different temporal circuits.

A first end of the storage capacitor C (shown as a first capacitor C1 in the first temporal circuit 2a and as a second capacitor C2 in the second temporal circuit 2b) is coupled to the reset transistor SWrst. The storage capacitor C is used to store voltage energy generated by the electrode ED, e.g., the first detected voltage $V_{SIG1}$ or the second detected voltage $V_{SIG2}$.

The first transistor SW1 (shown as SWa1 in the first temporal circuit 2a and as SWb1 in the second temporal circuit 2b) is coupled between the voltage source $V_{DD}$ and a node Vx, and is controlled by a control signal BIAS (shown as BIAS1 in the first temporal circuit 2a and as BIAS2 in the second temporal circuit 2b) to convert the stored voltage energy to a detection signal, e.g., the first detection signal A or the second detection signal B.

The second transistor SW2 (shown as SWa2 in the first temporal circuit 2a and as SWb2 in the second temporal circuit 2b) is coupled between the storage capacitor C and the first transistor SW1, and controlled by a control signal AZ (shown as AZ1 in the first temporal circuit 2a and as AZ2 in the second temporal circuit 2b). In the first interval $T_{SA}$, the second transistor SWb2 is not conducted to avoid changing the stored energy in the second capacitor C2; and in the second interval $T_{SB}$, the first transistor SWa2 is not conducted to avoid changing the stored energy in the first capacitor C1.

The third transistor SW3 (shown as SWa3 in the first temporal circuit 2a and as SWb3 in the second temporal circuit 2b) is coupled between a second end of the storage capacitor C and a ground voltage.

Please referring to FIG. 4A again, it shows that operation of the temporal circuit 2a/2b includes a reset interval, an energy transfer interval, an energy storage interval and a pulse width (PW) convert interval. In the reset interval, control signals BIAS, RESET and AZ are respectively at a high voltage level to reset potential on the storage capacitor C, e.g., a voltage of the node $V_{FD}$ being reset to $V_{RESET}$ (e.g., equal to $V_{DD}$) and a voltage of the node $V_G$ being reset to $V_{AZ}$. In the energy transfer interval, the control signal RESET is changed to a low voltage level, and when the control signal TX is changed to a high voltage level, the voltage energy $V_{SIG}$ detected by the electrode ED is transferred to the node $V_{FD}$ via the transfer transistor SWt to cause the voltage thereon to increase to $V_{RESET}+V_{SIG}$, wherein $V_{SIG}$ indicates the detected voltage energy. In the energy storage interval, the control signal RESET is changed to the high voltage level again and the control signals BIAS and AZ are changed to low voltage levels to store the voltage energy $V_{SIG}$ to the node $V_G$ to cause the voltage thereon to decrease to $V_{AZ}-V_{SIG}$. Meanwhile, if the control signal AZ is kept at the low voltage level to turn off the second transistor SW2, potential in the storage capacitor C is substantially kept constant.

In FIG. 4A, the reset interval, the energy transfer interval and the energy storage interval as a whole is used as an energy storage interval $T_{SA}$ of the first temporal circuit 2a or an energy storage interval $T_{SB}$ of the second temporal circuit 2b. Before the operation circuit 12 starts to operate, the first temporal circuit 2a and the second temporal circuit 2b sequentially store voltage energy detected by the electrode ED. As shown in FIG. 4A, till the PW convert interval is entered after the operation starts, the first detected voltage $V_{SIG1}$ in the first temporal circuit 2a is converted to the first detection signal A and the second detected voltage $V_{SIG2}$ in the second temporal circuit 2b is converted to the second detection signal B.

In the PW convert interval, the control signal BIAS uses a ramp signal having the voltage level decreasing with time. When the control signal BIAS starts at a high voltage level (e.g., $V_{BIAS\_AZ}$), the current I1 flowing through the first transistor SW1 is smaller than the current I3 flowing through the third transistor SW3 to cause an output voltage of Vx to have a low voltage level. With the level decreasing of the control signal BIAS, the current I1 is increasing correspondingly, and when the current I1 is substantially identical to the current I3, the output voltage of Vx changes to a high voltage level to form a negative PW signal. After the output voltage of Vx passes an inverter INV, a positive PW signal is generated as shown in FIG. 4A, wherein a pulse width ΔT is positively related to the voltage energy $V_{SIG}$. In this way, the temporal circuits 2a and 2b of the present disclosure convert voltage energy detected by the electrode ED to a timing signal to be operated by the operation circuit 12.

Please referring to FIG. 4B, it is an operational timing diagram of the neural signal detection circuit 200 in FIG. 2. The first temporal circuit 2a stores first detected voltage $V_{SIG1}$ in the first capacitor C1 in the first interval (e.g., the energy storage interval $T_{SA}$) using the operation of FIG. 4A. The second temporal circuit 2b stores second detected voltage $V_{SIG2}$ in the second capacitor C2 in the second interval (e.g., the energy storage interval $T_{SB}$) using the operation of FIG. 4A. Next, in the first operation interval $T_{O1}$, the first temporal circuit 2a uses a ramp signal having the voltage level decreasing with time as the control signal BIAS1 to convert the first detected voltage $V_{SIG1}$ into a first detection signal A; meanwhile, the second temporal circuit 2b uses a ramp signal having the voltage level decreasing with time as the control signal BIAS2 to convert the second detected voltage $V_{SIG2}$ into a second detection signal B. Preferably, the ramp signals BIAS1 and BIAS2 are substantially in-phase to generate detection signals A and B substantially at the same time, but not limited thereto. It is possible that detection signals A and B are generated sequentially depending on the operation of the operation circuit 12. The operation circuit 12 performs the numerical calculation on the first detection signal A and the second detection signal B in the first operation interval $T_{O1}$, e.g., the summation, subtraction and absolute differencing given in the present disclosure, but the present disclosure is not limited to these operations.

As shown in FIG. 4B, in the first operation interval $T_{O1}$, the first interval $T_{SA}$ for storing the first detected voltage $V_{SIG1}$ is prior to the second interval $T_{SB}$ for storing the second detected voltage $V_{SIG2}$.

In one aspect, after the first operation interval $T_{O1}$ is over, the second temporal circuit 2b continuously holds the second detected voltage $V_{SIG2}$, but the first temporal circuit 2a stores a next first detected voltage $V_{SIG1}'$ in the first capacitor C1 in a next energy storage interval $T_{SA}'$ also using the operation of FIG. 4A. Next, in a second operation interval $T_{O2}$, the first temporal circuit 2a uses a ramp signal having the voltage level decreasing with time as the control signal BIAS1 to convert the first detected voltage $V_{SIG1}'$ into a first detection signal A'; meanwhile, the second temporal circuit 2b uses a ramp signal having the voltage level decreasing with time as the control signal BIAS2 to convert the second detected voltage $V_{SIG2}$ into a second detection signal B, which is substantially identical to that generated in the first operation interval $T_{O1}$. The operation circuit 12 performs the numerical calculation on the first detection signal A' and the second detection signal B in the second operation interval $T_{O2}$. In the second operation interval Toa, the first interval $T_{SA}'$ for storing the first detected voltage $V_{SIG1}'$ is behind the second interval $T_{SB}$ for storing the second detected voltage $V_{SIG2}$.

In the next energy storage interval, the first detected voltage $V_{SIG1}'$ in the first temporal circuit 2a is maintained, but the second detected voltage in the second temporal circuit 2b is updated to $V_{SIG2}'$. By alternatively updating the voltage energy stored in the first temporal circuit 2a and the second temporal circuit 2b as shown in FIG. 4B, it is possible to perform the numerical calculation on signals of different time intervals.

Please referring to FIG. 5, it is a circuit diagram of a subtraction circuit 500 according to one embodiment of the present disclosure, which has two inputs respectively coupled to the first temporal circuit 2a and the second temporal circuit 2b to respectively receive a first detection signal A having a first pulse width T1 and a second detection signal B having a second pulse width T2. The subtraction circuit 500 includes an operation capacitor Co and cascaded first operation transistor SWA and second operation transistor SWB, wherein the operation capacitor Co is connected between the first operation transistor SWA and the second operation transistor SWB. The first operation transistor SWA is used as a switch to control a charging interval of a first current Ic to charge the operation capacitor Co according to the first pulse width T1; and the second operation transistor SWB is used as a switch to control a discharging interval of a second current Id to discharge the operation capacitor Co according to the second pulse width T2, wherein the first current Ic is substantially identical to the second current Id. In this way, the subtraction circuit 500 performs the numerical calculation of A-B. It is appreciated that when the subtraction circuit 500 performs the numerical calculation of B-A, gates of the first operation transistor SWA and the second operation transistor SWB receive opposite input signals, e.g., implemented by using a switching device or a multiplexer.

Please referring to FIG. 6, it is a circuit diagram of an addition circuit 600 according to one embodiment of the present disclosure, which has two inputs respectively coupled to the first temporal circuit 2a and the second temporal circuit 2b to respectively receive a first detection signal A having a first pulse width T1 and a second detection signal B having a second pulse width T2. The addition circuit 600 includes an operation capacitor Co and a first operation transistor SWA and a second operation transistor SWB connected in parallel, wherein the operation capacitor Co is connected between the first operation transistor SWA and the second operation transistor SWB. The first operation transistor SWA is used as a switch to control a first charging interval of a first current Ic1 to charge the operation capacitor Co according to the first pulse width T1; and the second operation transistor SWB is used as a switch to control a second charging interval of a second current Ic2 to charge the operation capacitor Co according to the second pulse width T2, wherein the first current Ic1 is substantially identical to the second current Ic2. In this way, the addition circuit 600 performs the numerical calculation of A+B.

Referring to FIG. 7, it is a circuit diagram of an absolute difference circuit 700 according to one embodiment of the present disclosure, which has two input sets respectively coupled to the first temporal circuit 2a and the second temporal circuit 2b to respectively receive first detection signals A and Abar having a first pulse width T1 and second detection signals B and Bbar having a second pulse width T2, wherein Abar and Bbar are generated from A and B using the inverter or vice versa. When the first pulse width T1 is larger than the second pulse width T2, the first input set (including operation transistors SWA and SWBbar) receives the pulse width signals A and Bbar to control a first charging interval of a first current Ic1 to charge the operation capacitor Co. When first pulse width T1 is smaller than the second pulse width T2, the second input set (including operation transistors SWB and SWAbar) receives the pulse width signals B and Abar to control a second charging interval of a second current Ic2 to charge the operation capacitor Co. In this way, the absolute difference circuit 700 performs the numerical calculation of |A−B|.

Although the current sources in FIGS. 5-7 are shown to be implemented by controlling a transistor using a control signal PBIAS, but the present disclosure is not limited thereto. Other current sources may be used.

Figure 8:
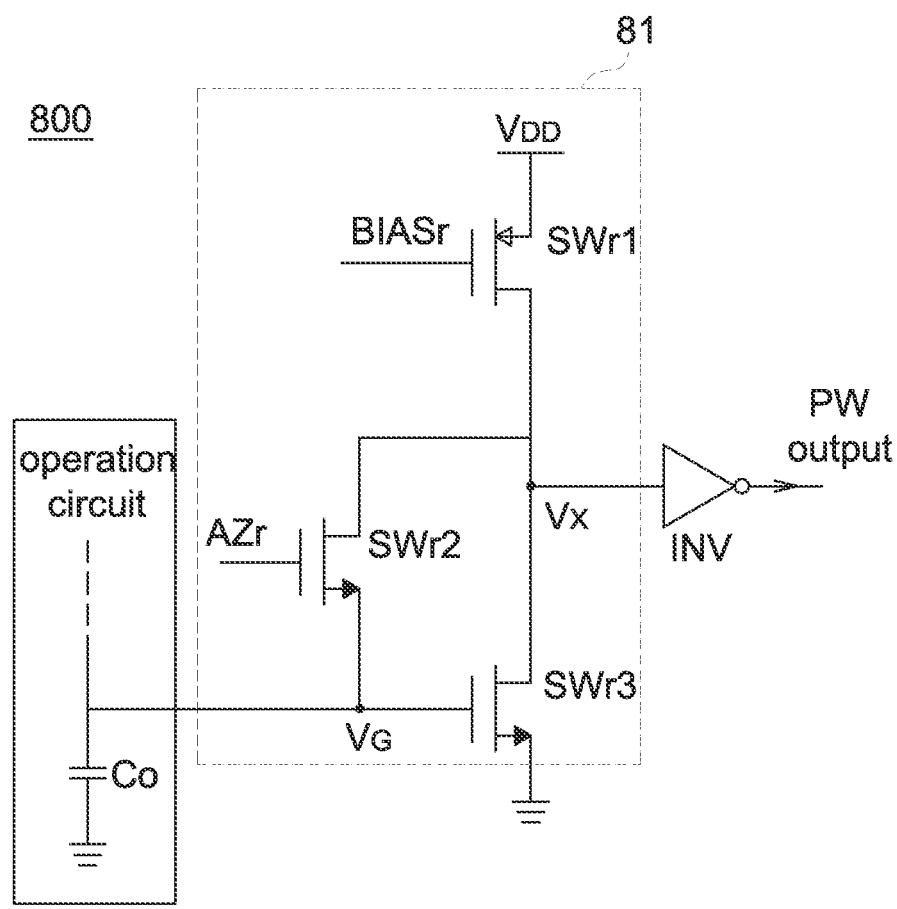
FIG. 8 is a circuit diagram of a recursive circuit of a neural signal detection circuit according to one embodiment of the present disclosure.

Please referring to FIG. 8, it is a circuit diagram of a recursive circuit 800 of a detection circuit according to one embodiment of the present disclosure. The recursive circuit 800 is coupled to the operation circuit 12 and used to control the operation timing of the operation circuit 12 and convert the operation result (i.e. potential stored in the operation capacitor Co) into a pulse width signal again for the next operation, e.g., the PW output of the recursive circuit 800 being coupled to one signal input of the operation circuit 12 as the signal A or B in FIGS. 5 to 7.

The recursive circuit 800 includes a first recursive transistor SWr1, a second recursive transistor SWr2 and a third recursive transistor SWr3, which have identical connection as the first transistor SW1, the second transistor SW2 and the third transistor SW3 in FIG. 3.

In FIG. 8, the circuit in a dashed block 81 is referred to a voltage-temporal conversion circuit which is used to convert a voltage on the operation capacitor Co to a PW signal similar to A and B, wherein the operation capacitor Co in FIG. 8 is the operation capacitor Co in FIGS. 5 to 7.

Figure 9:
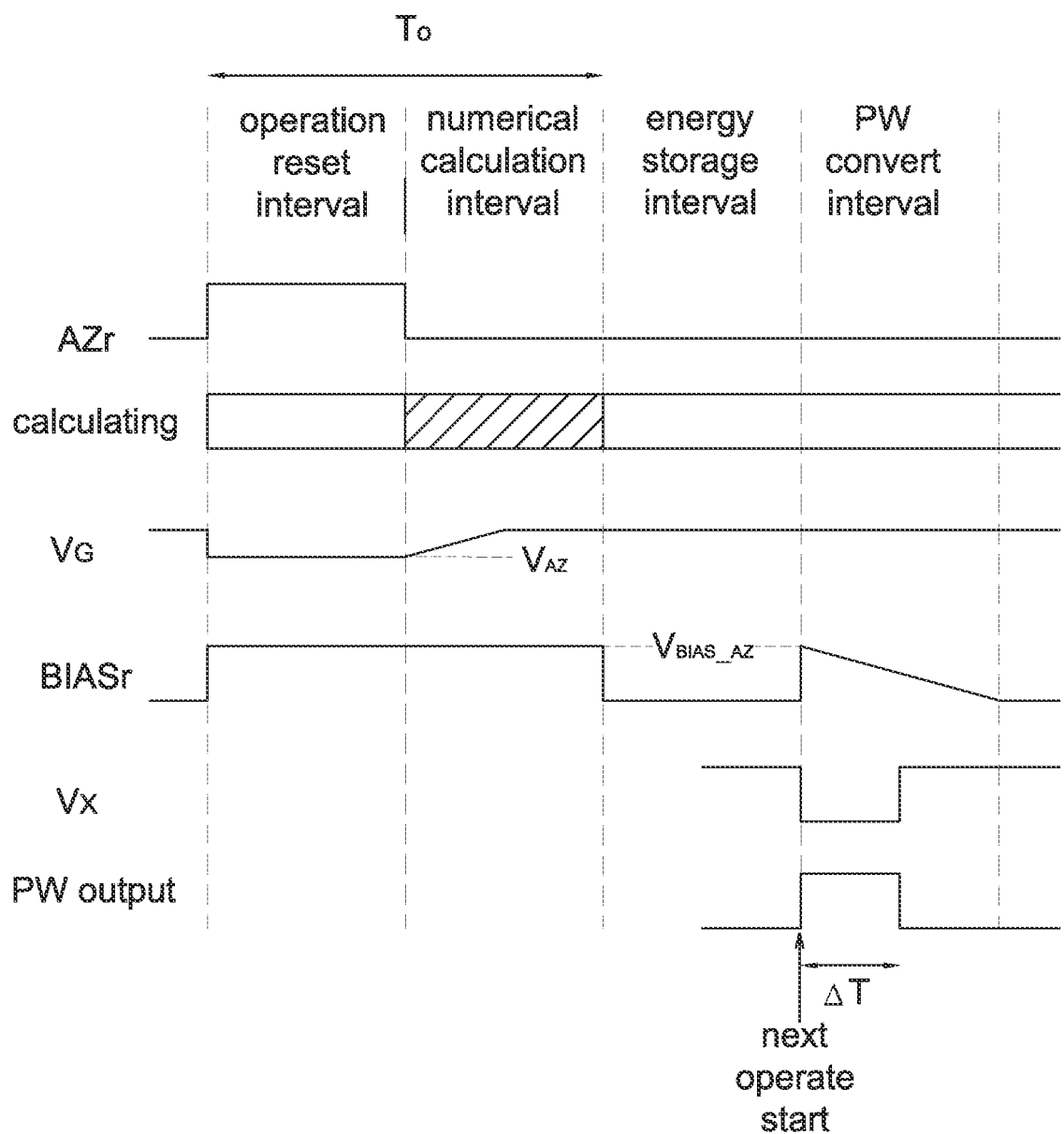
FIG. 9 is an operational timing diagram of the recursive circuit in FIG. 8.

Please referring to FIG. 9 together, it is an operational timing diagram of the recursive circuit 800 in FIG. 8. Before the operation capacitor Co starts to perform the numerical calculation on the detection signal A from the first temporal circuit 2a and the second detection signal B from the second temporal circuit 2b, the operation capacitor Co is reset at first. In the operation reset interval, control signals AZr and BIASr are respectively changed to a high voltage level for resetting a voltage of the operation capacitor Co to $V_{AZ}$. In this aspect, the second recursive transistor SWr2 is used as an operation reset transistor so as to reset the voltage of the operation capacitor Co in the operation reset interval. In the numerical calculation interval (e.g., slant-lines region), the control signal AZr is changed to a low voltage level and the operation result of the operation circuit 12 is stored in the operation capacitor Co to change a voltage thereon, wherein magnitude of the voltage change is corresponding to the operation result. Next, in the energy storage interval, the operation capacitor Co holds the voltage thereon. Till a next operation starts, the voltage-temporal conversion circuit 81 converts the calculated voltage to a PW signal for the operation of the operation circuit 12. The operations of the energy storage interval and the PW convert interval of the recursive circuit 800 are similar to those of the energy storage interval and the PW convert interval in FIG. 4A, e.g., using a ramp signal to generate the PW signal, and thus details thereof are not repeated herein.

In one aspect, the recursive circuit 800 further includes an inverter INV to invert a phase of the outputted PW signal. However, when the operation circuit 12 includes an inverter therein, the recursive circuit 800 does not include the inverter INV.

In the present disclosure, the PW convert interval of FIG. 4A as well as the operation reset interval and the numerical calculation interval of FIG. 9 as a whole is referred to an operation interval $T_O$ herein, wherein the operation reset interval of FIG. 9 is performed in parallel with or behind the PW convert interval of FIG. 4A.

It is appreciated that if there is no next operation after the recursive circuit 800, the recursive circuit 800 directly provides (e.g., controlled by a switching device) the calculated voltage on the operation capacitor Co to the identify circuit 14 for identification, e.g., compared with a reference voltage using a comparator.

The circuit in FIG. 8 is called recursive circuit because the operation result of the operation circuit 12 may be stored and then converted to a PW signal multiple times by the recursive circuit 800 to perform multiple recursive operations. That is, the operation circuit 12 not only calculates the detected result of the electrode ED, but also calculates the operation result thereof with the operation result of other detection circuits.

In this way, by using the detection circuit 200 of FIG. 2 in conjunction with the recursive circuit 800 of FIG. 8, it is possible to perform various operations on the neural data for various applications in analog phase. The identify circuit 14 performs various identifications according to a final operation result of the detection circuit 20 and the recursive circuit 800, e.g., identifying the lift-up of an electrode and performing multi-layer neural network so as to realize the circuit structure with in-circuit operation.

Figure 10:
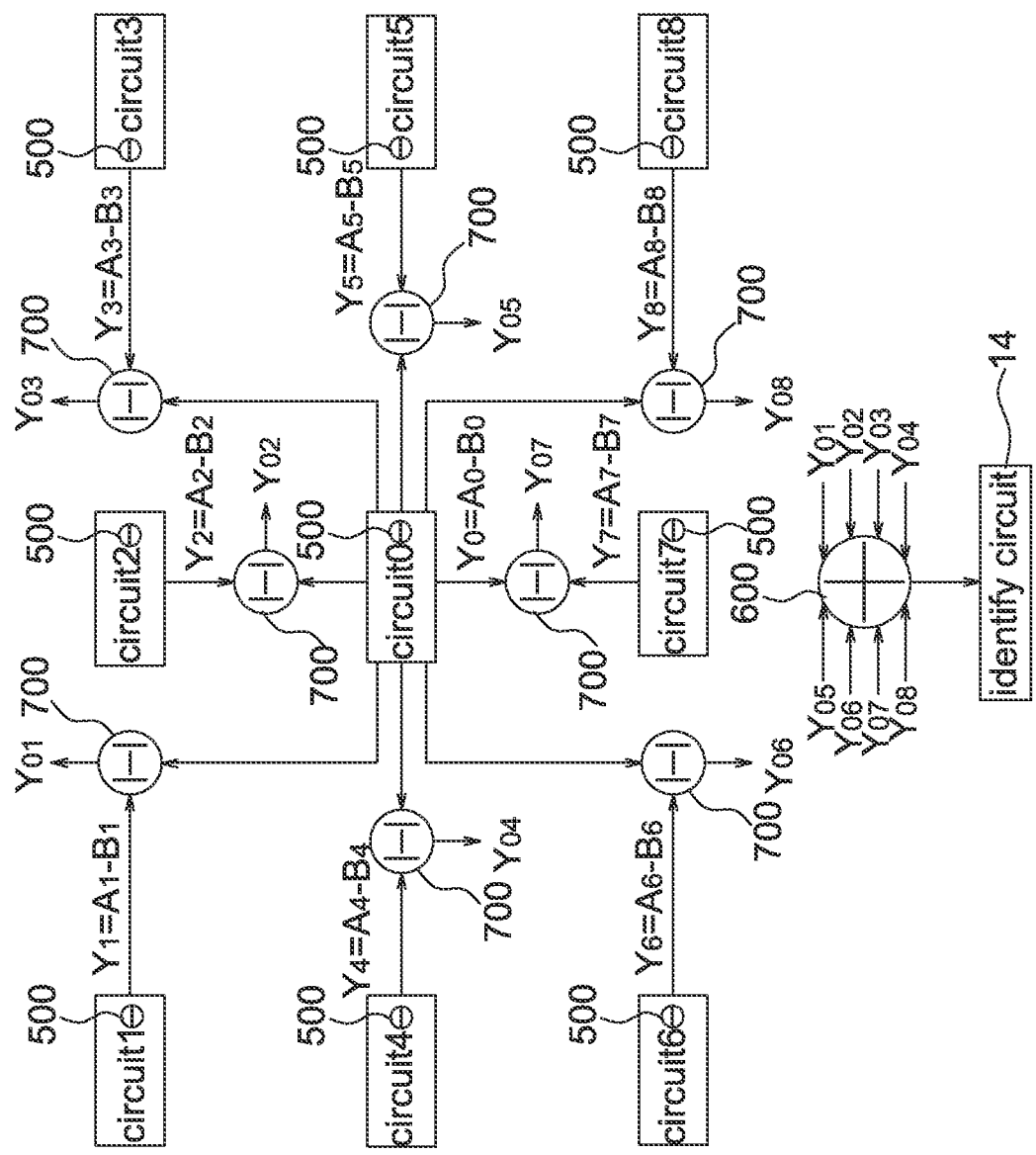
FIG. 10 is a schematic diagram of one application of a neural signal detection circuit according to one embodiment of the present disclosure.

For example referring to FIG. 10, it is a schematic diagram of one application of the neural signal detection circuit of the present disclosure that performs the array detection. A detection array includes multiple detection circuits arranged in an array. The identify circuit 14 performs the detection according to 9 adjacent detection circuits, including detection circuit 0 to detection circuit 8, wherein the detection circuit 0 is a central detection circuit of detection circuit 1 to detection circuit 8. In this aspect, the detection circuits 0 to 8 respectively include the detection circuit 200 in FIG. 2 and/or at least one operation circuit 12.

As mentioned above, detection circuits 0 to 8 respectively generate a first detection signals A0 to A8 and second detection signals B0 to B8. After the subtraction circuit 500 (e.g., included in the detection circuit of detection circuits 0 to 8, but not limited to) performs the numerical calculation on the first detection signals A0 to A8 and the second detection signal B0 to B8 of the detection circuits 0 to 8, the subtracted result Y0 to Y8 are obtained and stored in the corresponding operation capacitor Co (e.g., shown in FIG. 8), wherein Y0 to Y8 indicate that each of detection circuits 0 to 8 performs the temporal difference operation on detected signals obtained in different detection intervals to represent the voltage energy variation detected by every detection circuit.

Next, after converting Y0 to Y8 to PW signals using the recursive circuit 800, the absolute difference circuit 700 performs the numerical calculation of absolute differencing between Y0 and Y1, Y0 and Y2 ... Y0 and Y8 to obtain Y01 to Y08, wherein Y01 to Y08 indicate that the detection array performs the spatial difference operation between different detection circuits, and Y01 to Y08 contain the operation result of both the temporal difference and spatial difference.

Finally, Y01 to Y08 are summed by the addition circuit 600. Similarly, Y01 to Y08 are firstly stored in the corresponding operation capacitor Co, and then converted to PW signals by the voltage-temporal conversion circuit 81 for the summation of the addition circuit 600.

In one aspect, the addition circuit 600 includes two inputs as shown in FIG. 6, and the addition circuit each time performs the summation of two of Y01 to Y08 that is stored and voltage-temporal converted, and then summed with another one of the rest of Y01 to Y08 till all of Y01 to Y08 is added together.

In another aspect, the addition circuit includes 8 inputs and uses the pulse widths associated with Y01 to Y08 to control the charging intervals of respective current sources as a way of adding Y01 to Y08 together.

The identify circuit 14 receives a summation of the addition circuit 600, and compares the summation with a predetermined threshold (e.g., using a comparator). When the summation of Y01 to Y08 is larger than or equal to the predetermined threshold, it means that an EEG variation is detected.

In another aspect, the identify circuit 14 receives a summation of the temporal differences Y0 to Y8 (e.g., Y0 to Y8 directly outputted to the addition circuit 600 from detection circuits 0 to 8). When the summation is larger than or smaller than a threshold, it means that an electrode is lifted up.

It is appreciated that although FIG. 10 uses 9 neighboring detection circuits to detect the temporal and spatial voltage variation to perform the EEG detection or lift-up detection, the present disclosure is not limited thereto. The identify circuit 14 uses a proper number of detection circuits to detect the temporal and spatial voltage variation, e.g., the proper number being determined according to environment to be detected and a size of detection array.

Figure 11A:
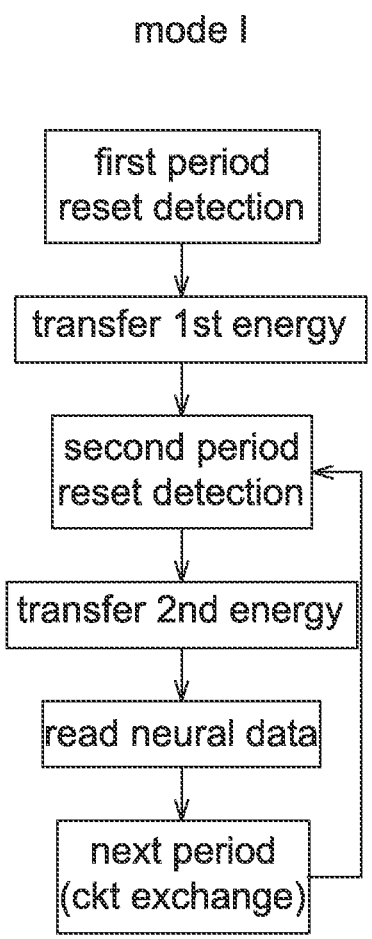
FIGS. 11A to 11C are flow charts of different modes performed by a neural signal detection circuit according to some embodiments of the present disclosure.
Figure 11B:
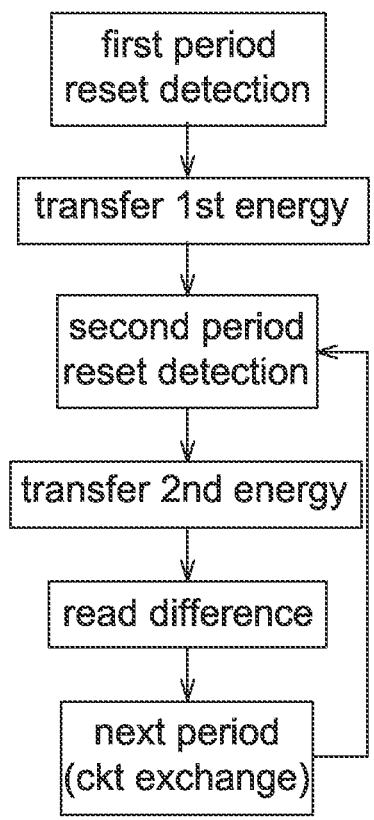
Figure 11C:
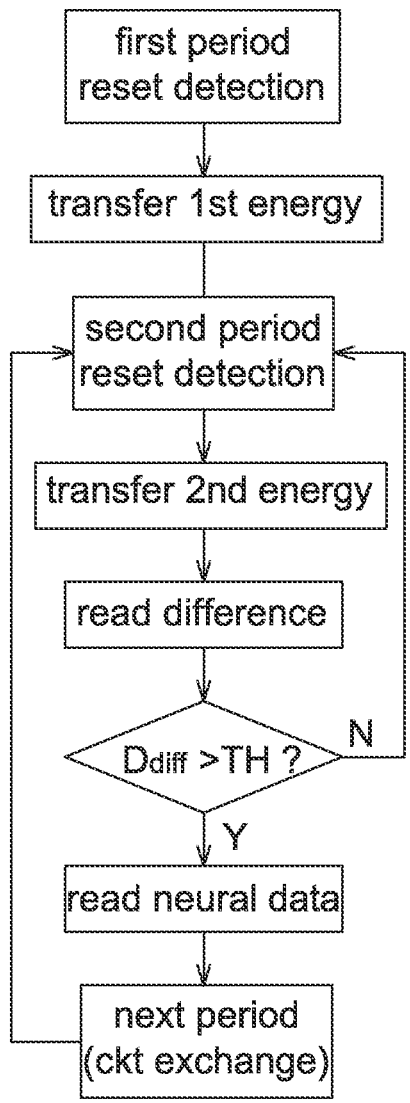

The neural signal detection circuit 200 of the present disclosure in FIG. 2 operates in different modes, e.g., including outputting neural data as shown in FIG. 11A, outputting difference data as shown in FIG. 11B and checking whether to output neural data as shown in FIG. 11C, according to different control signals, wherein the mode III is considered as a combination of modes I and II.

Figure 12:
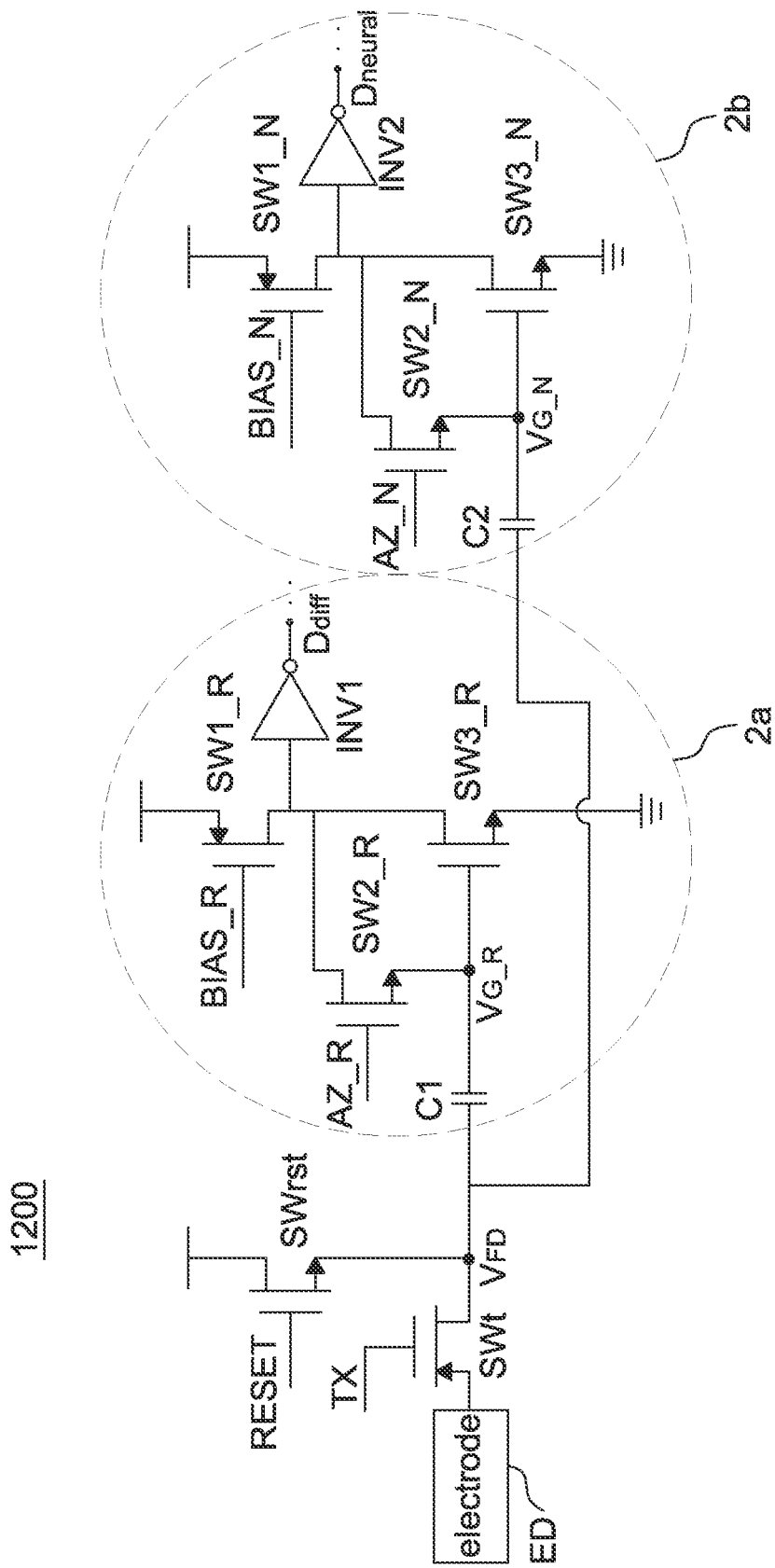
FIG. 12 is a schematic diagram of outputting time difference data or neural data by a neural signal detection circuit according to one embodiment of the present disclosure.

In FIG. 12, the first temporal circuit 2a is shown to output difference data $D_{diff}$ in an output interval (e.g., $T_{O1}$ in FIG. 4B) and the second temporal circuit 2b is shown to output neural data $D_{neural}$ in the output interval. In a next output interval (e.g., Toa in FIG. 4B), the first temporal circuit 2a outputs the neural data $D_{neural}$ but the second temporal circuit 2b outputs the difference data $D_{diff}$, repeatedly exchanging in successive output intervals.

That is, the "ckt exchange" shown in FIGS. 11A to 11C means temporal circuits recording and outputting the difference data $D_{diff}$ and the neural data $D_{neural}$ exchange in every output interval, i.e. an interval reading data or signal from the temporal circuits.

The neural signal detection circuit 1200 of FIG. 12 is identical to that in FIG. 2, and the difference therebetween is that control signals are changed to obtain different output signals from the two temporal circuits. In addition, to indicate different temporal circuits, elements and signals in the first temporal circuit 2a are indicated by _R, and elements and signals in the second temporal circuit 2b are indicated by _N in FIG. 12.

Figure 13:
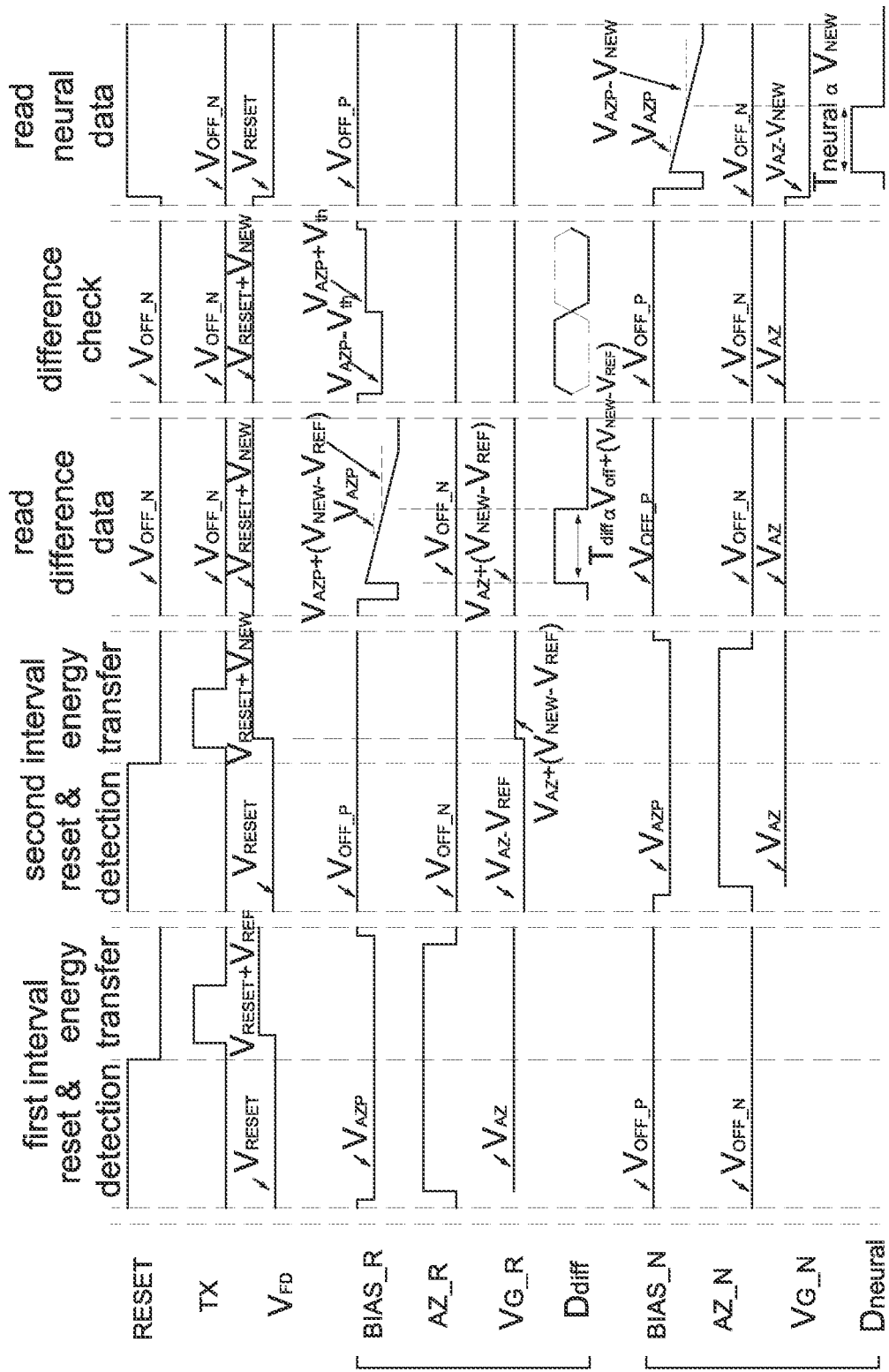
FIG. 13 is a signal timing diagram of the neural signal detection circuit of FIG. 12.

Please refer to FIG. 13, it is a signal timing diagram of the detection circuit 1200 in FIG. 12, including a first interval and a second interval for recording voltage energy, and three output intervals including a read difference data interval, a difference check interval and a read neural data interval.

In the reset & detection interval of the first interval, the electrode ED is operated, and a voltage on the node $V_{FD}$ is reset to $V_{RESET}$ and a voltage on the node $V_{G\_R}$ is reset to $V_{AZ}$ based on the arrangement of control signals BIAS_R, RESET and AZ_R as shown in FIG. 13.

In the energy transfer interval of the first interval, voltage energy $V_{REF}$ is transferred to the node $V_{FD}$ via the transfer transistor SWt such that a voltage on the node $V_{FD}$ is changed to $V_{RESET}+V_{REF}$ based on the arrangement of control signals BIAS_R, RESET and AZ_R as shown in FIG. 13.

In the reset & detection interval of the second interval, the electrode ED is operated again, and a voltage on the node $V_{FD}$ is reset to $V_{RESET}$ again. Now, as the storage capacitor C1 is floated (i.e., AZ_R changed to low voltage level), corresponding to a voltage change $V_{REF}$ on the node $V_{FD}$, a voltage on the node $V_{G\_R}$ is decreased by $V_{REF}$ to become $V_{AZ}-V_{REF}$.

In the energy transfer interval of the second interval, voltage energy $V_{NEW}$ is transferred to the node $V_{FD}$ via the transfer transistor SWt such that a voltage on the node $V_{FD}$ is changed to $V_{RESET}+V_{NEW}$, wherein the meaning of $V_{REF}$ is similar to $V_{SIG1}$ in FIG. 4B, and the meaning of $V_{NEW}$ is similar to $V_{SIG2}$ in FIG. 4B, only both $V_{REF}$ and $V_{NEW}$ in this embodiment are transferred to the node $V_{FD}$. Now, because the storage capacitor C1 is still floated, a voltage on the node $V_{G\_R}$ is changed to $V_{AZ}+(V_{NEW}-V_{REF})$. That is, the node $V_{G\_R}$ records a voltage energy variation $(V_{NEW}-V_{REF})$ between the first interval and the second interval detected by the electrode ED.

Next, by selecting control signals BIAS_R or BIAS_N, different modes shown in FIGS. 11A to 11C are selected.

In mode I shown in FIG. 11A, detected voltage energy $V_{NEW}$ of the second temporal circuit 2b is read. Since the detected voltage energy $V_{NEW}$ is not differenced with voltage energy detected in another interval, the detected voltage energy $V_{NEW}$ is considered as neural data detected by the detection circuit 1200 in the second interval.

Please refer to FIG. 13 again, in the energy transfer interval of the second interval, a voltage on the node $V_{FD}$ becomes $V_{NEW}-V_{RESET}$. In the read neural data period, the storage capacitor C2 is floated (i.e., AZ_N changed to low voltage level). When a voltage on the node $V_{FD}$ is reset to $V_{RESET}$, corresponding to a voltage change $V_{REF}$ on the node $V_{FD}$, a voltage on the node $V_{G\_N}$ is decreased by $V_{NEW}$ to become $V_{AZ}-V_{NEW}$. Using the similar method as FIG. 4A, a ramp signal is used as a control signal BIAS_N to be inputted to the first transistor SW1_N to output a pulse width signal Tneural, whose length is corresponding to magnitude of the voltage energy $V_{NEW}$, and details thereof have been illustrated above and are not repeated again. The pulse width signal Tneural is analog operated by other operation circuits as mentioned above or used in other applications by a backend processor.

In a next interval, when the electrode ED is operated, new neural data is recorded in the first temporal circuit 2a, but new difference data is recorded in the second temporal circuit 2b. Using the similar method as FIG. 4A, a ramp signal is used as a control signal BIAS_R to be inputted to the first transistor SW1_R to output a timing signal (i.e. pulse width signal) Tneural as neural data outputted by the detection circuit 1200.

In mode II shown in FIG. 11B, a voltage energy variation $(V_{NEW}-V_{REF})$ of the first temporal circuit 2a is read.

Please refer to FIG. 13 again, in the energy transfer interval of the second interval, a voltage on the node $V_{G\_R}$ is changed to $V_{AZ}+(V_{NEW}-V_{REF})$. In the read difference data interval, using the similar method as FIG. 4A, a ramp signal is used as a control signal BIAS_R to be inputted to the first transistor SW1_R to output a timing signal Tdiff, whose length is corresponding to magnitude of the voltage energy variation $(V_{NEW}-V_{REF})$, and details thereof have been illustrated above and thus are not repeated again.

It should be mentioned that in the read difference data interval, depending on voltage energy detected by the electrode ED in different intervals, the voltage energy variation $(V_{NEW}-V_{REF})$ is a positive or a negative value. In order to be able to output a corresponding pulse width signal (pulse width having no negative value) when $(V_{NEW}-V_{REF})$ is a negative value, a start voltage of the ramp signal is not from $V_{AZP}$ but from a voltage added by an offset voltage Voff. Although FIG. 13 shows that the pulse width signal Tdiff is positively related to Voff+$(V_{NEW}-V_{REF})$, when Voff is a fixed value, the pulse width signal Tdiff is substantially related to $(V_{NEW}-V_{REF})$ only.

It should be mentioned that although FIG. 13 shows that ramp control signals BIAS_R and BIAS_N are started after a voltage deep, the voltage deep is to form a start point of the ramp signal.

In a next interval, when the electrode ED is operated, new difference data $D_{diff}$ is recorded in the second temporal circuit 2b, but new neural data $D_{neural}$ is recorded in the first temporal circuit 2a. Using the similar method as FIG. 4A, a ramp signal is used as a control signal BIAS_N to be inputted to the first transistor SW1_N to output a timing signal Tdiff as difference data outputted by the detection circuit 1200.

In mode III shown in FIG. 11C, it is able to identify whether to read neural data recorded in the second temporal circuit 2b according to a difference signal ($V_{NEW}-V_{REF}$) recorded in the first temporal circuit 2a of detection circuit 1200.

Please refer to FIG. 13 again, in the difference check interval, a voltage $V_{AZP}$ of the control signal BIAS_R is added and subtracted by a voltage threshold Vth to be compared with $V_{AZ}+(V_{NEW}-V_{REF})$. When the variation ($V_{NEW}-V_{REF}$) is larger than Vth, the difference signal $D_{diff}$ has a state change, e.g., from 1 to 0 or from 0 to 1, indicating that the detection circuit 1200 detects a voltage energy variation between the first interval and the second interval. Accordingly, the backend processor reads neural data recorded on the node $V_{G\_N}$ of the second temporal circuit 2b of the detection circuit 1200 in the read neural data interval.

If the variation ($V_{NEW}-V_{REF}$) is not larger than Vth, a voltage on the node $V_{G\_N}$ is not read, and voltage energy detection of a next interval is performed as shown in FIG. 11C.

Similarly, in said next interval, when the electrode ED is operated, storage locations of the difference data and the neural data are exchanged. The backend processor identifies whether a voltage energy variation is larger than or equal to a threshold $V_{th}$ according to difference signal $D_{diff}$ of the second temporal circuit 2b to determine whether to read neural data $D_{neural}$ from the first temporal circuit 2a.

It should be mentioned that the read difference data interval, the difference check interval and the read neural data interval in FIG. 13 are not necessary to be all executed, but at least one is executed according to different applications.

For example please refer to FIG. 14, when a detection array includes multiple detection circuits 1200 (or 1500, 1700, 1800, 1900 mentioned below), based on the difference check shown in FIG. 13, it is able to check whether every detection circuit 1200 detects a voltage energy variation between a first frame and a second frame, i.e., by identifying a state change in the signal $D_{diff}$.

Figure 14:
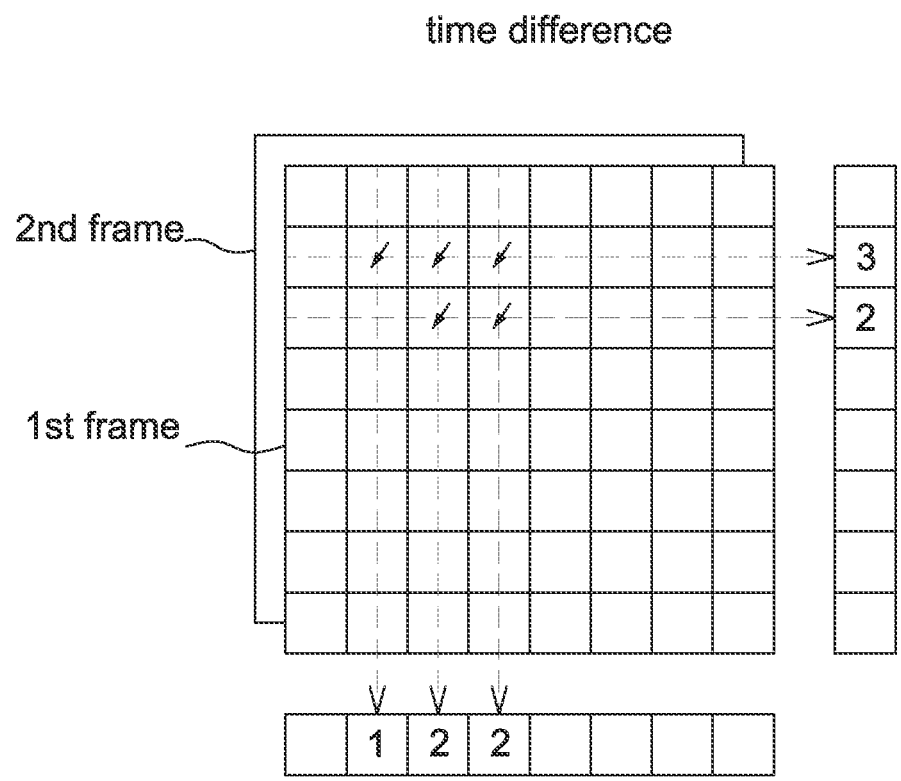
FIG. 14 is a schematic diagram of performing the time difference detection by a detection array adopting the neural signal detection circuit of the present disclosure.

In one aspect, a backend processor (e.g., the identifying circuit mentioned above or a backend host) tags detection circuit(s) 1200 detecting enough voltage energy variation, e.g., FIG. 14 showing five detection circuits (respectively indicated by an arrow symbol) detecting the voltage energy variation, i.e. $D_{diff}$ having a state change.

In another aspect, the backend processor reads neural data (i.e., pulse width signal herein) of the detection circuit(s) 1200 that detects the voltage energy variation for updating neural data stored in a corresponding frame buffer in the backend. The backend processor does not read neural circuit(s) 1200 without detecting the voltage energy variation.

It should be mentioned that how the backend processor uses the detection circuit(s) 1200 detecting enough voltage energy variation and neural data thereof is determined according to different applications.

As mentioned above, because the detection circuit 1200 of the present disclosure includes two temporal circuits, after the reset & detection and the energy transfer of two different intervals have been accomplished, the two temporal circuits respectively record time difference data (or signal) and neural data. By selecting different control signals BIAS_R and BIAS_N (e.g., using a switching device or multiplexer), different modes of FIG. 11A to FIG. 11C are operated.

Figure 15:
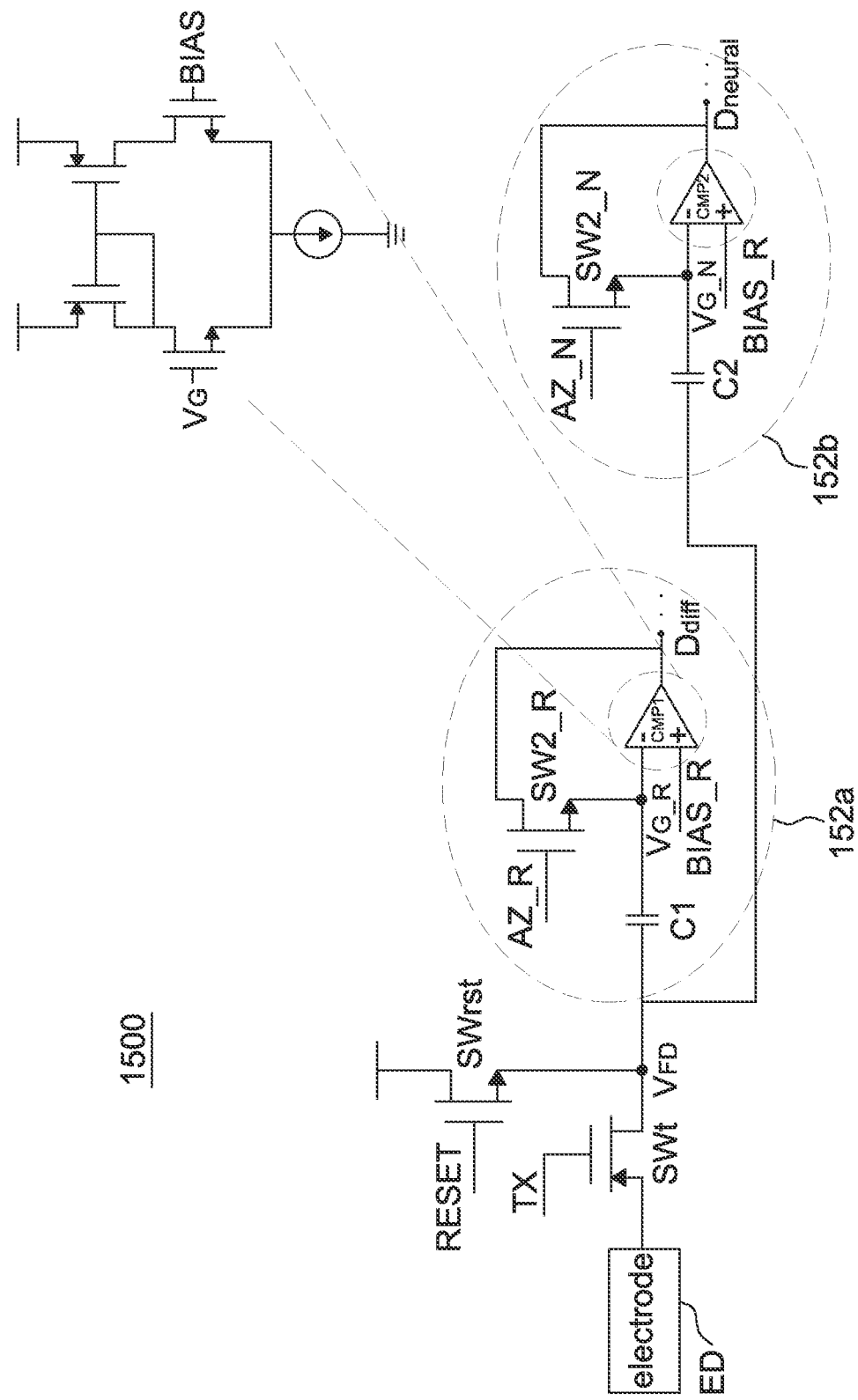
FIG. 15 is a circuit diagram of an alternative embodiment I of a neural signal detection circuit of the present disclosure.

Please refer to FIG. 15, it is a circuit diagram of a neural signal detection circuit 1500 according to an alternative embodiment of the present disclosure. The detection circuit 1500 is also capable of operating in different modes of FIGS. 11A to 11C according to different control signals BIAS_R and BIAS_N.

The difference between the detection circuit 1500 in FIG. 15 and the detection circuit 1200 in FIG. 12 is that comparators are used to replace the first transistors SW1_R and SW1_N as well as the third transistors SW3_R and SW3_N. The circuit shown in the top right corner of FIG. 15 indicates a structure of both comparators and input signals thereof. An inverting input terminal of the comparator CMP1 is connected to a second end of the first capacitor C1 and the second transistor SW2_R. A non-inverting input terminal of the comparator CMP1 receives the control signal BIAS_R. An inverting input terminal of the comparator CMP2 is connected to a second end of the second capacitor C2 and the second transistor SW2_N. A non-inverting input terminal of the comparator CMP2 receives the control signal BIAS_N. Compared with FIG. 12, this embodiment can reduce the current and the influence of noises.

Figure 16:
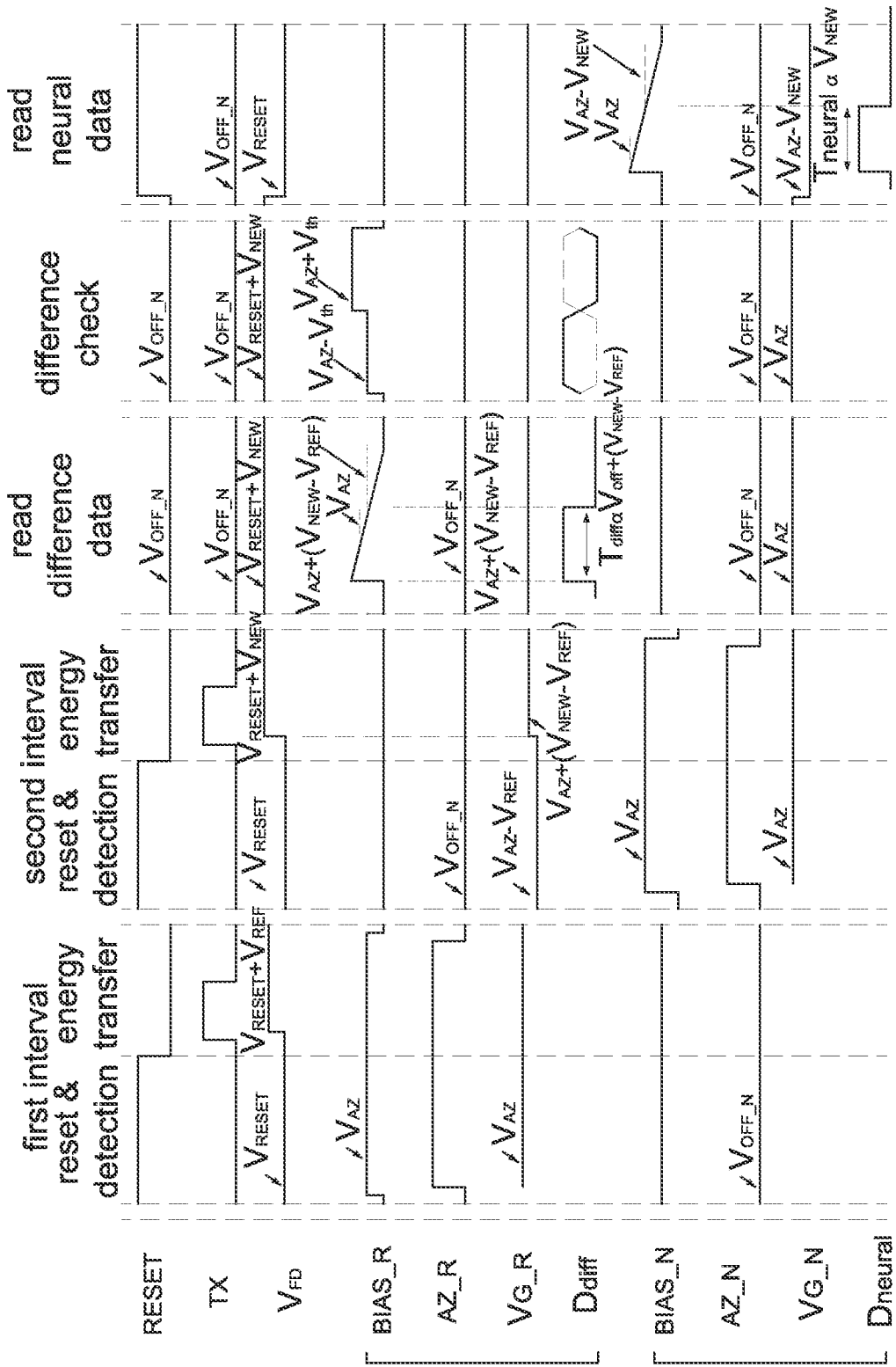
FIG. 16 is a signal timing diagram of the neural signal detection circuit of FIG. 15.

Please refer to FIG. 16, it is a signal timing diagram of the detection circuit 1500 of FIG. 15.

Similarly, in a first interval, the electrode ED is operated, and a voltage on the node $V_{FD}$ becomes $V_{RESET}+V_{REF}$ based on the arrangement of control signals BIAS_R, RESET and AZ_R as shown in FIG. 16. In a second interval, the electrode ED is operated again, and a voltage on the node $V_{G\_R}$ becomes $V_{AZ}+(V_{NEW}-V_{REF})$ based on the arrangement of control signals BIAS_R, RESET and AZ_R as shown in FIG. 16.

In a read neural data interval, the storage capacitor C2 is floated (i.e. AZ_N changed to a low voltage level). When a voltage on the node $V_{FD}$ is reset to $V_{RESET}$, corresponding to a voltage variation $V_{REF}$ on the node $V_{FD}$, a voltage on the node $V_{G\_N}$ is decreased by $V_{NEW}$ to become $V_{AZ}-V_{NEW}$. A ramp signal is used as a control signal BIAS_N to be inputted to the comparator CMP2 to cause the comparator CMP2 to output a timing signal Tneural.

In a read difference data interval, a ramp signal is used as a control signal BIAS_R to be inputted to the comparator CMP1 to cause the comparator CMP1 to output a timing signal Tdiff.

In a difference check interval, the voltage $V_{AZ}$ is added and subtracted by a voltage threshold Vth as the control signal BIAS_R to be compared with $V_{AZ}+(V_{NEW}-V_{REF})$. When the variation ($V_{NEW}-V_{REF}$) is larger than Vth, the difference signal $D_{diff}$ has a state change.

The read difference data, difference check and read neural data are similar to those shown in FIG. 13, and the main difference is that the control signals BIAS_R and BIAS_N are different.

In FIG. 15, all transistors of the comparators CMP1 and CMP2 are arranged in the detection circuit 1500, and thus the detection circuit 1500 has a larger area.

Figure 17:
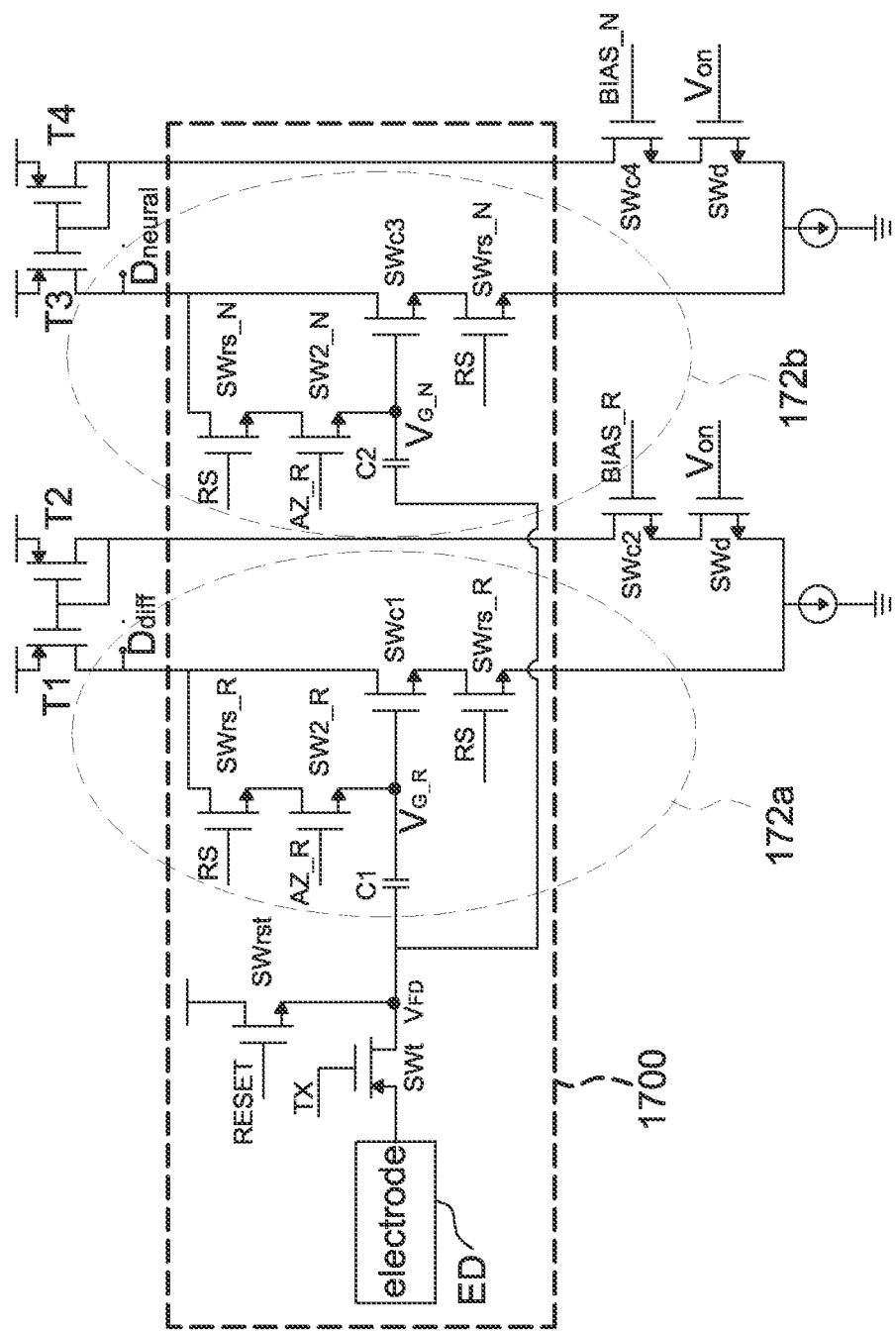
FIG. 17 is a circuit diagram of an alternative embodiment II of a neural signal detection circuit of the present disclosure.

Please refer to FIG. 17, it is a circuit diagram of a neural signal detection circuit 1700 according to an alternative embodiment of the present disclosure. The main difference from FIG. 15 is that a first input transistor SWc1 and a third input transistor SWc3 of comparators are arranged inside the detection circuit 1700, but other transistors of the comparators are arranged outside the detection circuit 1700 to be shared with other neural signal detection circuits. Said other neural signal detection circuits are multiple neural signal detection circuits at the same column (e.g., same column of a detection array shown in FIG. 14) as the detection circuit 1700.

The signal timing diagram of the detection circuit 1700 is also in FIG. 16.

In this alternative embodiment, the detection circuit 1700 includes an electrode ED, a transfer transistor SWt, a reset transistor SWrst, a first temporal circuit 172a and a second temporal circuit 172b.

The first temporal circuit 172a includes a first capacitor (or storage capacitor) C1 and a second transistor SW2_R, which are respectively functioned similar to the elements C1 and SWa2 in FIG. 2 and thus details thereof are not repeated herein. The first capacitor C1 has a first end (e.g., left end shown in FIG. 17) coupled to the electrode ED.

The first temporal circuit 172a further includes a first input transistor SWc1, as an inverting input terminal of a first comparator, connected to a second end (e.g., right end as shown in FIG. 17) of the first capacitor C1. The first comparator further includes a second input transistor SWc2 and transistors T1 and T2 arranged outside the detection circuit 1700, and shared by the first temporal circuit 172a and other detection circuits. The second input transistor SWc2 is used as a non-inverting input terminal of the first comparator.

The second temporal circuit 172b includes a second capacitor (or storage capacitor) C2 and a second transistor SW2_N, which are respectively functioned similar to the elements C2 and SWb2 in FIG. 2 and thus details thereof are not repeated herein. The second capacitor C2 has a first end (e.g., left end shown in FIG. 17) coupled to the electrode ED.

The second temporal circuit 172b further includes a third input transistor SWc3, as an inverting input terminal of a second comparator, connected to a second end (e.g., right end as shown in FIG. 17) of the second capacitor C2. The second comparator further includes a fourth input transistor SWc4 and transistors T3 and T4 arranged outside the detection circuit 1700, and shared by the second temporal circuit 172b and the other neural signal detection circuits. The fourth input transistor SWc4 is used as a non-inverting input terminal of the second comparator.

The electrode ED generates detected voltage, e.g., including $V_{REF}$ and $V_{NEW}$ shown in FIG. 16.

The transfer transistor SWt is connected between the electrode ED and the first end of the first capacitor C1 as well as the first end of the second capacitor C2. As shown in FIG. 16, the transfer transistor SWt is used to transfer detected voltages (e.g., including $V_{REF}$ and $V_{NEW}$) in the first interval and the second interval to the first temporal circuit 172a (e.g., respectively shown as $V_{RESET}+V_{REF}$ and $V_{RESET}+V_{NEW}$ on the node $V_{FD}$), and transfer detected voltages (e.g., including $V_{NEW}$) in the second interval to the second temporal circuit 172b (e.g., shown as $V_{RESET}+V_{NEW}$ on the node $V_{FD}$).

The reset transistor SWrst is connected between the transfer transistor SWt and the first end of the first capacitor C1 as well as the first end of the second capacitor C2. The function of the reset transistor SWrst has been illustrated above, and thus is not repeated herein.

The second transistor SW2_R is connected between the first capacitor C1 and the first input transistor SWc1, wherein the second transistor SW2_R of the first temporal circuit 172a is not conducted in the second interval, as shown in FIG. 16 that the control signal AZ_R is at a low voltage level in the second interval. The second transistor SW2_N is connected between the second capacitor C2 and the third input transistor SWc3, wherein the second transistor SW2_N of the second temporal circuit 172b is not conducted in the first interval, as shown in FIG. 16 that the control signal AZ_N is at a low voltage level in the first interval.

In this embodiment, the first temporal circuit 172a is used to record a voltage energy variation of voltage energy detected by the electrode ED between the first interval and the second interval, as shown in FIG. 16 when the transfer transistor SWt is conducted in the second interval, a voltage on the node $V_{G\_R}$ becomes $V_{AZ}+(V_{NEW}-V_{REF})$, wherein $V_{AZ}$ is a voltage on the node $V_{G\_R}$ in the reset interval. The second temporal circuit 172b is used to record detected voltage of the electrode ED in the second interval, as shown in FIG. 16 in the read neural data interval when the node $V_{FD}$ is reset to the voltage $V_{RESET}$, a voltage on the node $V_{G\_N}$ becomes $V_{AZ}-V_{NEW}$.

According to the input signal of the second input transistor SWc2, the detection circuit 1700 operates in different modes, as shown in FIG. 11B and FIG. 11C. When the second input transistor SWc2 receives a ramp signal (e.g., shown in the read difference data interval in FIG. 16), the first temporal circuit 172a outputs a pulse width signal Tdiff corresponding to the voltage energy variation ($V_{NEW}-V_{REF}$). As mentioned above, it is possible that ($V_{NEW}-V_{REF}$) is a negative value, and a start point of the ramp signal is added by a voltage offset Voff.

When the second input transistor SWc2 sequentially receives a lower threshold voltage $V_{AZ}$-Vth and an upper threshold voltage $V_{AZ}$+Vth (e.g., shown in the difference check interval in FIG. 16), it is able to check whether the voltage energy variation ($V_{NEW}-V_{REF}$) exceeds the voltage threshold Vth. If $V_{AZ}+(V_{NEW}-V_{REF})$ does not exceed a range between the upper threshold voltage $V_{AZ}$+Vth and the lower threshold voltage $V_{AZ}$-Vth, the output signal $D_{diff}$ does not have a state change, and it means that the detection circuit 1700 does not detect enough energy variation. If $V_{AZ}+(V_{NEW}-V_{REF})$ exceeds a range between the upper threshold voltage $V_{AZ}$+Vth and the lower threshold voltage $V_{AZ}$-Vth, the output signal $D_{diff}$ has a state change, and it means that the detection circuit 1700 detects the energy variation, and the backend processor may perform the corresponding operations accordingly.

According to the input signal of the fourth input transistor SWc4, the detection circuit 1700 operates in another mode, as shown in FIG. 11A. When the fourth input transistor SWc4 receives a ramp signal (e.g., shown in the read neural data interval in FIG. 16), the second temporal circuit 172b outputs a pulse width signal Tneural corresponding to the detected voltage energy $V_{NEW}$. Because the detected voltage energy $V_{NEW}$ is not a negative value since it is not differenced with any signal, no voltage offset Voff is required.

In one aspect, the first temporal circuit 172a further includes row selection transistors SWrs_R (e.g., shown two) connected between the first temporal circuit 172a and the first comparator. The row selection transistors SWrs_R are used to connect the first temporal circuit 172a to the first comparator according to a row selection signal RS. The second temporal circuit 172b further includes row selection transistors SWrs_N (e.g., shown two) connected between the second temporal circuit 172b and the second comparator. The row selection transistors SWrs_N are used to connect the second temporal circuit 172b to the second comparator according to the row selection signal RS.

Operations of the detection circuit 1700 not described are referred to FIG. 16.

Figure 18:
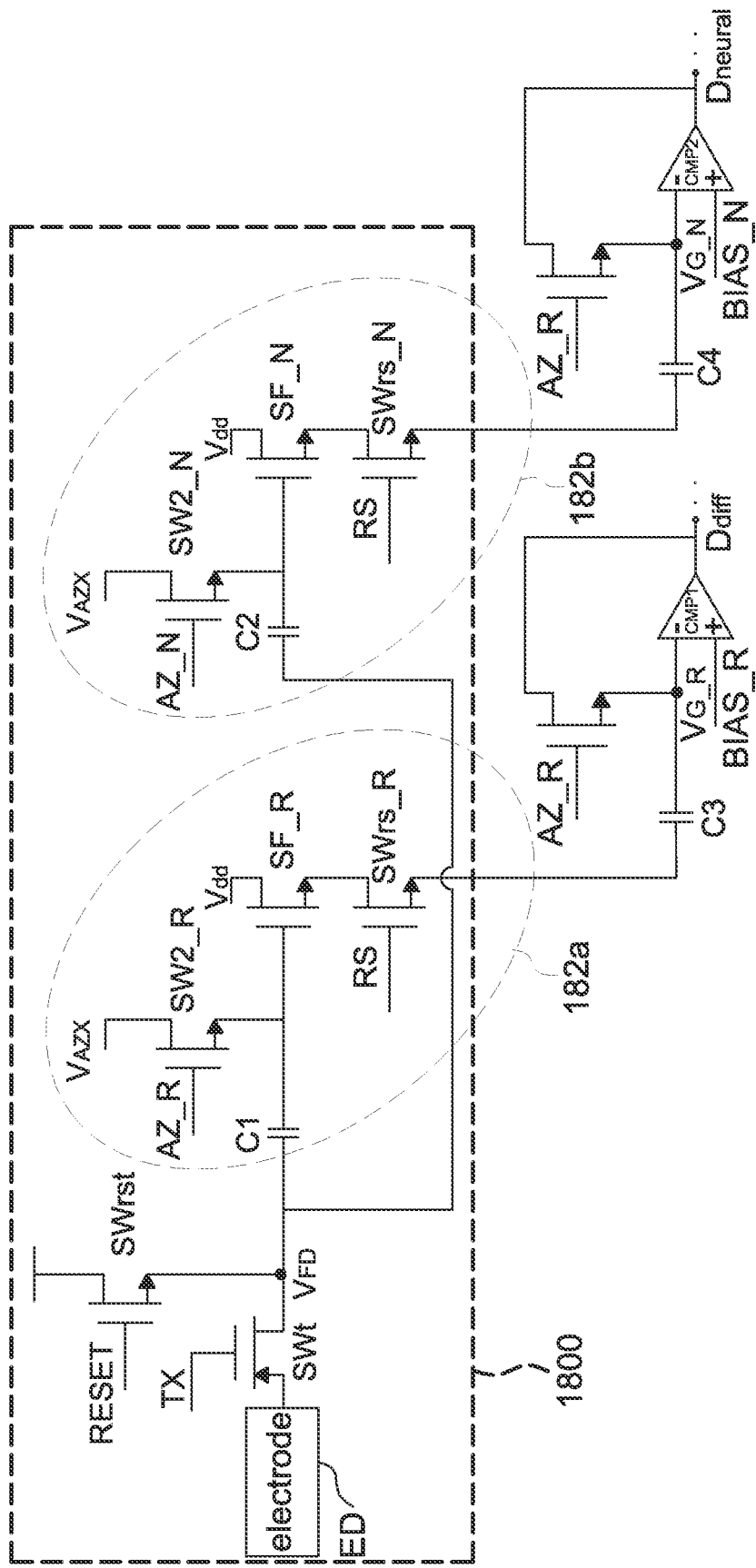
FIG. 18 is a circuit diagram of an alternative embodiment III of a neural signal detection circuit of the present disclosure.

Please refer to FIG. 18, it is a circuit diagram of a detection circuit 1800 according to an alternative embodiment of the present disclosure. The main difference from FIG. 17 is that the first comparator and the second comparator are all arranged outside the detection circuit 1800 to be shared with other neural signal detection circuits. Said other neural signal detection circuits are multiple neural signal detection circuits at the same column (e.g., same column of a detection array shown in FIG. 14) as the detection circuit 1800.

The signal timing diagram of the detection circuit 1800 is also in FIG. 16.

The detection circuit 1800 includes an electrode ED, a transfer transistor SWt, a reset transistor SWrst, a first temporal circuit 182a and a second temporal circuit 182b.

The first temporal circuit 182a includes a first capacitor C1 and a second transistor SW2_R, which are respectively functioned similar to the elements C1 and SWa2 in FIG. 2 and thus details thereof are not repeated herein. The first capacitor C1 has a first end (e.g., left end shown in FIG. 18) coupled to the electrode ED.

A second end (e.g., right end as shown in FIG. 18) of the first capacitor C1 in the first temporal circuit 182a is coupled to an inverting input terminal of a first comparator CMP1. The first comparator CMP1 is arranged outside the detection circuit 1800, and shared by the first temporal circuit 182a and other detection circuits.

The second temporal circuit 182b includes a second capacitor C2 and a second transistor SW2_N, which are respectively functioned similar to the elements C2 and SWb2 in FIG. 2 and thus details thereof are not repeated herein. The second capacitor C2 has a first end (e.g., left end shown in FIG. 18) coupled to the electrode ED.

A second end (e.g., right end as shown in FIG. 18) of the second capacitor C2 in the second temporal circuit 182b is coupled to an inverting input terminal of a second comparator CMP2. The second comparator CMP2 is arranged outside the detection circuit 1800, and shared by the second temporal circuit 182b and the other neural signal detection circuits.

The electrode ED generates detected voltages, e.g., including $V_{REF}$ and $V_{NEW}$ shown in FIG. 16.

The transfer transistor SWt is connected between the electrode ED and the first end of the first capacitor C1 as well as the first end of the second capacitor C2. As shown in FIG. 16, the transfer transistor SWt is used to transfer voltage energy (e.g., including $V_{REF}$ and $V_{NEW}$) in the first interval and the second interval to the first temporal circuit 182a (e.g., respectively shown as $V_{RESET}+V_{REF}$ and $V_{RESET}+V_{NEW}$ on the node $V_{FD}$), and transfer voltage energy (e.g., including $V_{NEW}$) in the second interval to the second temporal circuit 182b (e.g., shown as $V_{RESET}+V_{NEW}$ on the node $V_{FD}$).

The reset transistor SWrst is connected between the transfer transistor SWt and the first end of the first capacitor C1 as well as the first end of the second capacitor C2. The function of the reset transistor SWrst has been illustrated above, and thus is not repeated herein.

The second transistor SW2_R is connected between the first capacitor C1 and the first comparator CMP1, wherein the second transistor SW2_R of the first temporal circuit 182a is not conducted in the second interval, as shown in FIG. 16 that the control signal AZ_R is at a low voltage level in the second interval. The second transistor SW2_N is connected between the second capacitor C2 and the comparator CMP2, wherein the second transistor SW2_N of the second temporal circuit 182b is not conducted in the first interval, as shown in FIG. 16 that the control signal AZ_N is at a low voltage level in the first interval.

In this embodiment, the first temporal circuit 182a is used to record a voltage energy variation of voltage energy detected by the electrode ED between the first interval and the second interval, as shown in FIG. 16 when the transfer transistor SWt is conducted in the second interval, a voltage on the node $V_{G\_R}$ becomes $V_{AZ}+(V_{NEW}-V_{REF})$, wherein $V_{AZ}$ is a voltage on the node $V_{G\_R}$ in the reset interval. The second temporal circuit 182b is used to record detected voltage of the electrode ED in the second interval, as shown in FIG. 16 in the read neural data interval when the node $V_{FD}$ is reset to the voltage $V_{RESET}$, a voltage on the node $V_{G\_N}$ becomes $V_{AZ}-V_{NEW}$.

According to the input signal of a non-inverting input terminal of the first comparator CMP1, the detection circuit 1800 operates in different modes, as shown in FIG. 11B and FIG. 11C. For example, when a non-inverting input terminal of the first comparator CMP1 receives a ramp signal (e.g., shown in the read difference data interval in FIG. 16), the first temporal circuit 182a outputs a pulse width signal Tdiff corresponding to the voltage energy variation ($V_{NEW}-V_{REF}$). As mentioned above, it is possible that ($V_{NEW}-V_{REF}$) is a negative value, and a start point of the ramp signal is added by a voltage offset Voff.

When the non-inverting input terminal of the first comparator CMP1 sequentially receives a lower threshold voltage $V_{AZ}$-Vth and an upper threshold voltage $V_{AZ}$+Vth (e.g., shown in the difference check interval in FIG. 16), it is able to check whether the voltage energy variation ($V_{NEW}-V_{REF}$) exceeds the voltage threshold Vth. If $V_{AZ}+(V_{NEW}-V_{REF})$ does not exceed a range between the upper threshold voltage $V_{AZ}$+Vth and the lower threshold voltage $V_{AZ}$-Vth, the output signal $D_{diff}$ does not have a state change, and it means that the detection circuit 1800 does not detect enough energy variation. If $V_{AZ}+(V_{NEW}-V_{REF})$ exceeds a range between the upper threshold voltage $V_{AZ}$+Vth and the lower threshold voltage $V_{AZ}$-Vth, the output signal $D_{diff}$ has a state change, and it means that the detection circuit 1800 detects the energy variation, and the backend processor may perform corresponding operations.

It should be mentioned that a sequence of inputting the upper threshold voltage and the lower threshold voltage is not particularly limited.

According to the input signal of a non-inverting input terminal of the second comparator CMP2, the detection circuit 1800 operates in another mode, as shown in FIG. 11A. When the non-inverting input terminal of the second comparator CMP2 receives a ramp signal (e.g., shown in the read neural data interval in FIG. 16), the second temporal circuit 182b outputs a pulse width signal Tneural corresponding to the detected voltage energy $V_{NEW}$. Because the detected voltage energy $V_{NEW}$ is not a negative value since it is not differenced with any signal, no voltage offset Voff is required.

In order to allow a voltage on the first capacitor C1 to be losslessly buffered to the capacitor C3, the first temporal circuit 182a further includes a first source follower SF_R connected between the first capacitor C1 and the second transistor SW2_R as well as the first comparator CMP1. In order to allow a voltage on the second capacitor C2 to be losslessly buffered to the capacitor C4, the second temporal circuit 182b further includes a second source follower SF_N connected between the second capacitor C2 and the second transistor SW2_N as well as the second comparator CMP2.

In one aspect, the first temporal circuit 182a further includes a row selection transistor SWrs_R connected between the first source follower SFR and the first comparator CMP1. The row selection transistor SWrs_R is used to connect the first source follower SF_R to the first comparator CMP1 according to a row selection signal RS. The second temporal circuit 182b further includes a row selection transistor SWrs_N connected between the second source follower SF_N and the second comparator CMP2. The row selection transistor SWrs_N is used to connect the second source follower SF_N to the second comparator CMP2 according to the row selection signal RS.

Operations of the detection circuit 1800 not described herein are referred to FIG. 16.

In the alternative embodiment of FIG. 18, the first comparator CMP1 and the second comparator CP2 are arranged outside the detection circuit 1800 to be shared with other neural signal detection circuits. Therefore, in FIG. 16, operations of the first interval and the second interval are performed in the detection circuit 1800, but operations of the output stage (i.e. conducting row selection transistors SWrs_R and SWrs_N), including reading difference data, difference checking and reading neural data, are mainly performed outside the detection circuit 1800.

That is, multiple detection circuits 1800 of one column sequentially use the comparators CMP1 or CMP2 to output a timing signal or a difference check signal according to the row selection signal RS.

Figure 19:
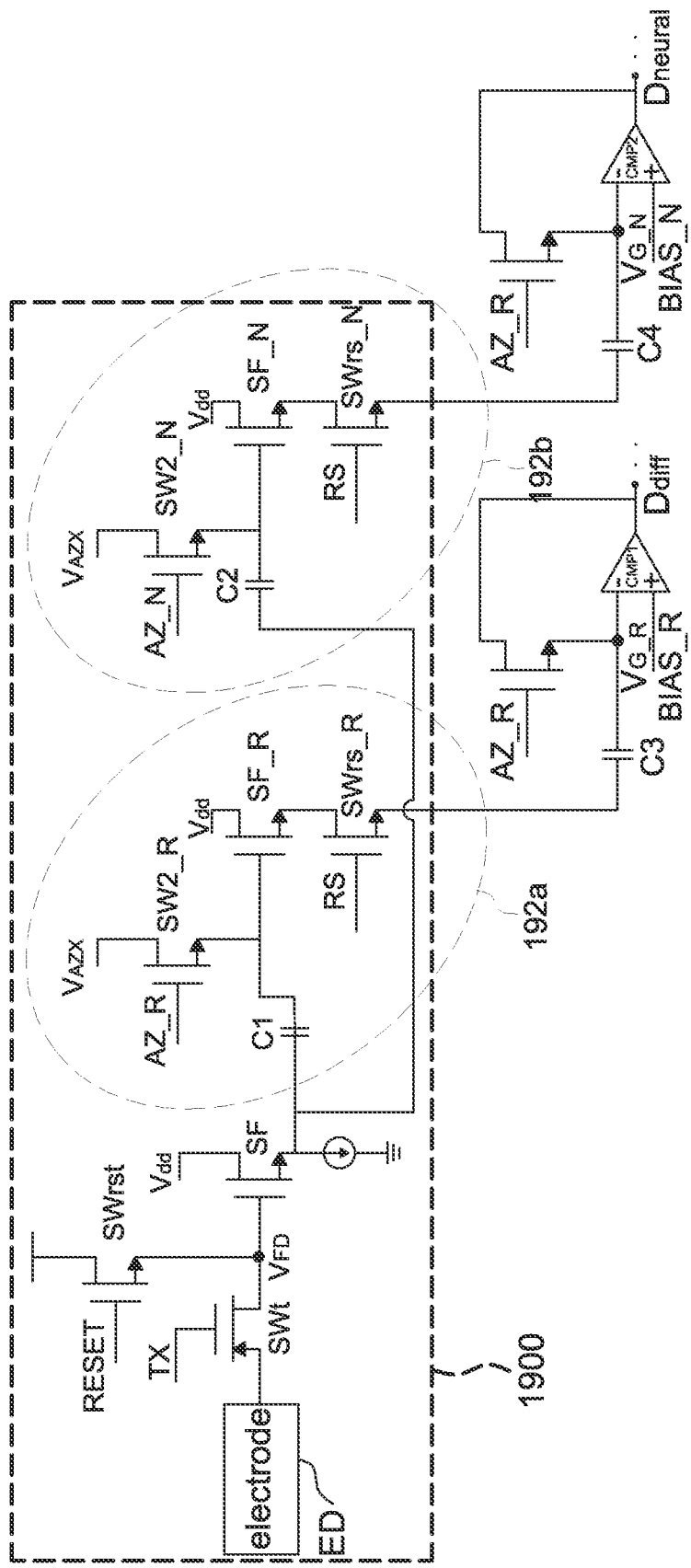
FIG. 19 is a circuit diagram of an alternative embodiment IV of a neural signal detection circuit of the present disclosure.

Please refer to FIG. 19, it is a circuit diagram of a neural signal detection circuit 1900 according to an alternative embodiment of the present disclosure. The main difference from FIG. 18 is that a source follower SF is further connected respectively between the transfer transistor SWt and the first capacitor C1 of the first temporal circuit 192a as well as the second capacitor C2 of the second temporal circuit 192b so as to losslessly buffer a voltage on the node WI) to the first capacitor C1 and the second capacitor C2 to improve the sensitivity and conversion gain of the detection circuit.

Other parts of FIG. 19 are identical to FIG. 18 and operated as shown in FIG. 16, and thus details thereof are not repeated herein.

In this alternatively embodiment of FIG. 19, a second end of the first capacitor C1 is coupled to a non-inverting input terminal of the first comparator CMP1, which is arranged outside the detection circuit 1900 and shared by the first temporal circuit 192a and other neural signal detection circuits. A second end of the second capacitor C2 is coupled to a non-inverting input terminal of the second comparator CMP2, which is arranged outside the detection circuit 1900 and shared by the second temporal circuit 192b and the other neural signal detection circuits. Said other neural signal detection circuits are multiple detection circuits at the same column (e.g., same column in a detection array of FIG. 14) as the detection circuit 1900.

It should be mentioned that operations of the detection circuits 1500, 1700, 1800 and 1900 are applied to every detection circuit of a detection array, e.g., shown in FIG. 14.

It should be mentioned that since locations of recording the time difference data and the neural data are exchanged, it is possible the first temporal circuit records the neural data and the second temporal circuit records the difference data in the first cycle.

It should be mentioned that one component inside a detection circuit described herein means that every detection circuit in a detection array has the one component, and one component outside a detection circuit described herein means that one column in the detection array shares the one component.

The present disclosure is also applicable to retinal chips as long as the sensing element (i.e. electrode) is replaced by a light sensing element, e.g., photodiode as mentioned in parent applications, and details thereof have been illustrated in the parent applications and thus are not repeated herein.

As mentioned above, the processing and analyzing EEG signals is an important issue. Accordingly, the present disclosure provides a neural signal detection circuit that outputs time difference data (e.g., FIG. 2, FIGS. 5 to 7, FIG. 12 and FIGS. 15-19) and accomplishes neural signal calculation in analog phase.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A neural signal detection circuit, comprising:
an electrode, configured to generate a detected voltage as an electroencephalogram signal;
a first temporal circuit, comprising:
a first capacitor having a first end coupled to the electrode;
a second temporal circuit, comprising:
a second capacitor having a first end coupled to the electrode;
a transfer transistor, connected between the electrode and the first end of the first capacitor as well as the first end of the second capacitor, and configured to transfer the detected voltage to the first temporal circuit in a first interval and a second interval, and transfer the detected voltage to the second temporal circuit in the second interval; and
a reset transistor, connected between the transfer transistor and the first end of the first capacitor as well as the first end of the second capacitor, wherein
a second end of the first capacitor is coupled to an inverting input terminal of a first comparator, which is arranged outside the neural signal detection circuit and shared by the first temporal circuit and other neural signal detection circuits, and
a second end of the second capacitor is coupled to an inverting input terminal of a second comparator, which is arranged outside the neural signal detection circuit and shared by the second temporal circuit and the other neural signal detection circuits, and the second end of the second capacitor is not coupled to the second end of the first capacitor, wherein
the first temporal circuit further comprises a second transistor connected between the first capacitor and the first comparator,
the second temporal circuit further comprises a second transistor connected between the second capacitor and the second comparator, and
the second transistor of the first temporal circuit is not conducted in the second interval, and the second transistor of the second temporal circuit is not conducted in the first interval.

2. The neural signal detection circuit as claimed in claim 1, wherein the other neural signal detection circuits are multiple neural signal detection circuits at a same column of a detection array as the detection circuit.

3. The neural signal detection circuit as claimed in claim 1, wherein
the first temporal circuit is configured to record a voltage energy variation from the electrode between the first interval and the second interval, and the second temporal circuit is configured to record the detected voltage from the electrode in the second interval.

4. The neural signal detection circuit as claimed in claim 3, wherein a non-inverting input terminal of the first comparator is configured to
receive a ramp signal to cause the first comparator to output a pulse width signal corresponding to the voltage energy variation, or
sequentially receive an upper threshold voltage and a lower threshold voltage to confirm whether the voltage energy variation exceeds the upper threshold voltage or the lower threshold voltage.

5. The neural signal detection circuit as claimed in claim 3, wherein a non-inverting input terminal of the second comparator is configured to
receive a ramp signal to cause the second comparator to output a pulse width signal corresponding to the detected voltage.

6. The neural signal detection circuit as claimed in claim 1, further comprising:
a first source follower, connected to the first capacitor and the second transistor of the first temporal circuit;
a first row selection transistor, connected between the first source follower and the first comparator;
a second source follower, connected to the second capacitor and the second transistor of the second temporal circuit; and
a second row selection transistor, connected between the second source follower and the second comparator.

7. A neural signal detection circuit, comprising:
a source follower;
a first temporal circuit, comprising:
a first capacitor having a first end coupled to the source follower;
a second temporal circuit, comprising:
a second capacitor having a first end coupled to the source follower, wherein
a second end of the first capacitor is coupled to an inverting input terminal of a first comparator, which is arranged outside the neural signal detection circuit and shared by the first temporal circuit and other neural signal detection circuits, and
a second end of the second capacitor is coupled to an inverting input terminal of a second comparator, which is arranged outside the neural signal detection circuit and shared by the second temporal circuit and the other neural signal detection circuits, and the second end of the second capacitor is not coupled to the second end of the first capacitor;
a first source follower, connected to the second end of the first capacitor;
a first row selection transistor, connected between the first source follower and the first comparator;
a second source follower, connected to the second end of the second capacitor; and
a second row selection transistor, connected between the second source follower and the second comparator.

8. The neural signal detection circuit as claimed in claim 7, further comprising:
an electrode, configured to generate detected voltage as an electroencephalogram signal;
a transfer transistor, connected between the electrode and the source follower, and configured to transfer the detected voltage to the first temporal circuit via the source follower in a first interval and a second interval, and transfer the detected voltage to the second temporal circuit via the source follower in the second interval; and
a reset transistor, connected between the transfer transistor and the source follower.

9. The neural signal detection circuit as claimed in claim 8, wherein
the first temporal circuit is configured to record a voltage energy variation from the electrode between the first interval and the second interval, and
the second temporal circuit is configured to record the detected voltage from the electrode in the second interval.

* * * * *